United States Patent
Wu et al.

(10) Patent No.: US 7,817,817 B2
(45) Date of Patent: Oct. 19, 2010

(54) METHOD FOR CONCEALING DATA IN CURVES OF AN IMAGE

(75) Inventors: Min Wu, Clarksville, MD (US); Hongmei Gou, College Park, MD (US)

(73) Assignee: University of Maryland, College Park, MD (US)

( * ) Notice: Subject to any disclaimer, the term of this patent is extended or adjusted under 35 U.S.C. 154(b) by 1380 days.

(21) Appl. No.: 11/221,727

(22) Filed: Sep. 9, 2005

(65) Prior Publication Data

US 2006/0056695 A1 Mar. 16, 2006

Related U.S. Application Data

(60) Provisional application No. 60/608,839, filed on Sep. 10, 2004.

(51) Int. Cl.
*G06K 9/00* (2006.01)

(52) U.S. Cl. .................. 382/100; 382/113; 382/199

(58) Field of Classification Search .................. 382/100
See application file for complete search history.

(56) References Cited

U.S. PATENT DOCUMENTS

| | | | | |
|---|---|---|---|---|
| 6,058,200 | A * | 5/2000 | Blaseio | 382/100 |
| 6,304,266 | B1 * | 10/2001 | Li | 345/424 |
| 6,567,087 | B1 * | 5/2003 | Reid | 345/428 |
| 6,678,378 | B1 * | 1/2004 | Akiyoshi | 380/54 |
| 6,697,497 | B1 * | 2/2004 | Jensen et al. | 382/100 |
| 6,748,362 | B1 * | 6/2004 | Meyer et al. | 704/500 |
| 6,956,568 | B2 * | 10/2005 | Maekawa et al. | 345/420 |
| 7,117,026 | B2 * | 10/2006 | Shao et al. | 600/411 |
| 7,190,805 | B2 * | 3/2007 | Silverstein | 382/100 |
| 7,412,360 | B2 * | 8/2008 | Surazhsky et al. | 703/2 |
| 2001/0056410 | A1 * | 12/2001 | Ishigaki | 705/67 |
| 2003/0128209 | A1 * | 7/2003 | Maekawa et al. | 345/420 |
| 2003/0161498 | A1 * | 8/2003 | Oami | 382/100 |
| 2004/0027344 | A1 * | 2/2004 | Ohto | 345/419 |
| 2004/0095352 | A1 * | 5/2004 | Huang | 345/473 |
| 2004/0113910 | A1 * | 6/2004 | Tsai et al. | 345/420 |
| 2006/0056695 | A1 * | 3/2006 | Wu et al. | 382/173 |
| 2008/0240491 | A1 * | 10/2008 | Hori | 382/100 |

(Continued)

OTHER PUBLICATIONS

Sanchez-Reyes, J., "A simple technique for NURBS shape modification", Computer Graphics and Applications, IEEE, Jan./Feb. 1997, vol. 17, Issue: 1, pp. 52-59, ISSN: 0272-1716.*

(Continued)

*Primary Examiner*—Sath V Perungavoor
(74) *Attorney, Agent, or Firm*—Rosenberg, Klein & Lee

(57) ABSTRACT

A method of concealing data in images imperceptibly alters curves therein, such as through adding a value representing the data to be hidden to each of a number of B-spline control points representing the original curve. The altered control points characterize the imperceptibly altered curve, which replaces the original curve in the image. The altered control points may be later extracted from the image and compared with the original control points to determine the hidden value. Prudent selection of the values altering the control points as well as an iterative alignment-minimization algorithm in the detection process provides protection against numerous techniques for preventing the hidden values from being recovered.

9 Claims, 18 Drawing Sheets

U.S. PATENT DOCUMENTS

2009/0070075 A1* 3/2009 Funk .............................. 703/1
2009/0092278 A1* 4/2009 Doi et al. ..................... 382/100

OTHER PUBLICATIONS

Ohbuchi, R., Masuda, H., Aono, M., "A shape-preserving data embedding algorithm for NURBS curves and surfaces", Computer Graphics International, 1999. Proceedings, 1999, pp. 180-187, ISBN: 0-7695-0185-0.*

Jae Jun Lee, Nam Ik Cho, Jong Weon Kim, "Watermarking for 3D NURBS graphic data", Multimedia Signal Processing, 2002 IEEE Workshop on, Dec. 9-11, 2002, pp. 304-307, ISBN: 0-7803-7713-3.*

Jae Jun Lee, Nam Ik Cho, Sang Uk Lee, "Watermarking algorithms for 3D NURBS graphic data", EURASIP Journal on Applied Signal Processing, vol. 2004, (Jan. 2004), pp. 2142-2152, ISSN:1110-8657.*

Chang, H., et al.; "Watermarking 2D/3D graphics for copyright protection"; in Proc. IEEE ICASSP; 2003, pp. 720-723.

Barni, M., et al.; "Robust watermarking of cartographic images"; EURASIP J. Applied Signal Process.; vol. 2, 2002, pp. 197-208.

Solachidis, V., et al.; "Watermarking polygonal lines using Fourier descriptors"; IEEE Computer Graphics Appl.; vol. 24, No. 3, May/Jun. 2004, pp. 44-51.

Ohbuchi, R.; et al.; "Watermarking 2D vector maps in the mesh-spectral domain"; Proc. Shape Modeling Int. Conf.; 2003.

Ohbuchi, R., et al.; "A shape-preserving data embedding algorithm for NURBS curves and surfaces"; in Proc. CGI; 1999, pp. 180-187.

Lee, J., et al.; "Watermarking algorithms for 3D NURBS graphic data"; EURASIP J. Appl. Signal Process.; No. 14, Oct. 2004, pp. 2142-2152.

Praun, E. et al.; "Robust mesh watermarking"; in Proc. Comput. Graphics; 1999, pp. 49-56.

Cox, I., et al.; "Secure spread spectrum watermarking for multimedia"; IEEE Trans. Image Process.; vol. 6, No. 12, Dec. 1997, pp. 1673-1687.

Xia, M., et al.; "Image registration by 'super-curves'"; IEEE Trans. Image Process.; vol. 13, No. 5, May 2004, pp. 720-732.

Sole, A., et al.; "Morse description and geometric encoding of Digital Elevation Maps"; IEEE Trans. On Image Processing; vol. 13, No. 9, Sep. 2004, pp. 1245-1262.

* cited by examiner

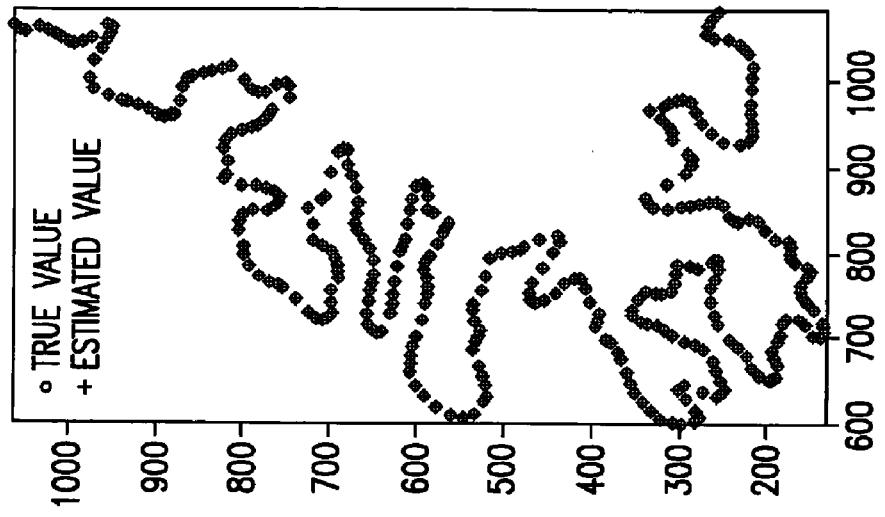
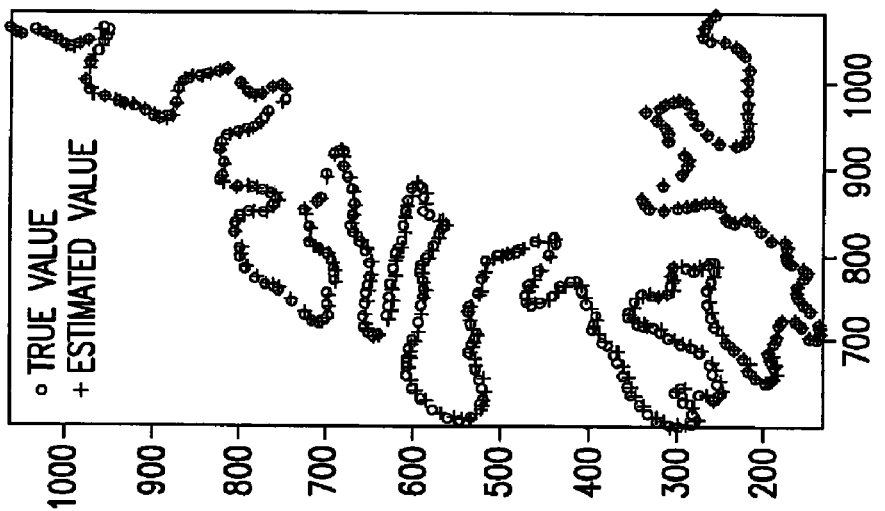
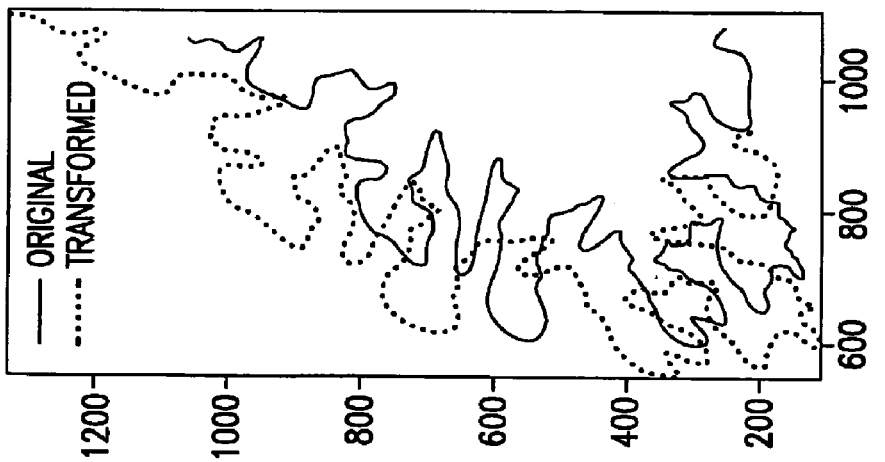

METHOD FOR CONCEALING DATA IN CURVES OF AN IMAGE

RELATED APPLICATION DATA

This Application is based on Provisional Patent Application 60/608,839, filed 10 Sep. 2004.

BACKGROUND OF THE INVENTION

1. Field of the Invention

The invention described herein is most directly related to watermarking or fingerprinting data in images. Specifically, the invention is directed to altering curves in images by hiding data in parameters defining the curves, where the hidden data may be extracted from the difference between the original parameter and the altered parameter.

2. Description of the Prior Art

Many beneficial features of the present invention may be described in the context of maps, which are representations of geospatial information and are ubiquitous in government, military, intelligence, and commercial operations. As the creation and distribution of maps requires a considerable investment of a map publisher's resources recoverable primarily through sales and licensing, map publishers are highly motivated to prevent unauthorized copying or distribution.

Traditional methods for protecting a map include deliberately placing errors in the map, such as spelling "Nelson Road" as "Nelsen Road," bending a road in the wrong direction, and/or placing a nonexisting pond. A map containing essentially the known set of errors is strong evidence of piracy that may even be presented in court. In one of the classic lawsuits involving such data, *Rockford Map Pub. Versus Dir. Service Co. of Colorado*, 768 F.2d 145, 147 (7*th* Cir., 1985), phony middle initials of names in a subject map spelled out "Rockford Map Inc." when read from the top of the map to the bottom and copyright infringement was thereby found.

Unfortunately, many traditional copy protection methods alter the geospatial quality of a map and can thereby pose a serious hazard in critical government, military, intelligence, and commercial operations. Furthermore, errors serving as "fingerprints" to trace individual copies can often be easily identified and removed by computer programs. All of these limitations motivate the development of an efficient method for map protection that is both more effective and less intrusive than those traditionally implemented. It is further desired to have the capability to trace a leak of protected information to the source "traitor", i.e., having one or more identifying marks in the document be associated to a specific user, which can then be traced to the user if the document were to be found in the possession of an unauthorized entity.

Curvilinear structures are major components of maps, drawings, signatures, and other images and graphics. A huge number of curve-based documents continue to be brought into the digital domain, owing to the popularity of scanning devices and pen-based devices, such as Tablet PCs. Images such as digital maps and drawings are also generated directly by various computer programs, such as map-making software and computer-aided design systems. The capability of hiding digital watermarks or other secondary data in curves, such as that provided by the present invention, can facilitate digital rights management of important documents in government, military, and commercial operations.

To be an effective forensic mechanism for tracing a document to its source, unique digital IDs embedded in a document, referred to herein as digital fingerprints, must be difficult to remove. For maps and other visual documents, the fingerprint has to be embedded in a robust way against attempts to bypass the protection, such as by collusion, where several users combine information from several copies of the protected map, each having the same content but different fingerprints, so as to generate a new copy in which the original fingerprints are removed or attenuated. Other bypass techniques include various geometric transformations, such as rotation, scaling, and translation (RST), and D/A-A/D conversions, such as printing-and-scanning. At the same time, the fingerprint must also be embedded in a visually nonintrusive way, i.e., without changing the geographical and/or visual information conveyed by the document, in that, as previously stated, intrusive changes may have serious consequences in critical military and commercial operations. For example, disastrous equipment failures and even loss of life can ensue when inaccurate data are given to troops or fed into navigation systems.

There are a limited number of existing techniques for watermarking maps, and few methods that exploit curve features or address fingerprinting issues. A text-based geometric normalization method is described by Barni, et al., in, "Robust Watermarking of Cartographic Images", *EURASIP J. Applied Signal Process.*, vol. 2, pp. 197-208, 2002, whereby text labels are used to normalize the orientation and scale of the map image and conventional watermarking algorithms for grayscale images are subsequently applied. Other techniques include watermarking vector graphics by perturbing vertices through Fourier descriptors of polygonal lines, as described by Solachidis, et al., "Watermarking Polygonal Lines using Fourier Descriptors", *IEEE Computer Graphics Appl.*, vol. 24, no. 3, pp. 44-51, May/June 2004, or by spectral analysis of mesh models to embed copyright marks, as shown by Ohbuchi, et al., "Watermarking 2D Vector Maps in the Mesh-Spectral Domain", *Proc. Shape Modeling Int. Conf.*, 2003. The embedding demonstrated by Solachidis, et al. introduces visible distortions, which are shown in the experimental results disclosed in the reference. The watermarking approach of Ohbuchi, et al. is of high complexity resulting from the mesh spectral analysis and cannot be easily applied to maps beyond urban areas, where curves of land features and underwater terrains are highly prominent.

Curve-based documents are also represented as binary bitmap images (known as the raster representation thereof) and, as such, the prior art includes techniques for data embedding in general binary images. However, the fragility of the conventional embedding techniques for raster images and their dependence on precise sampling of pixels for correct decoding severely limit their applicability. Other methods embed information in dithered images by manipulating the dithering patterns. Known methods include manipulating the run-length fax images and changing the line spacing and character spacing in textual images. However, these methods cannot be extended easily to marking curve-based documents.

Several watermarking algorithms on graphic data explore compact representations of curves or surfaces for data embedding, such as through the nonuniform rational B-spline (NURBS) parameters. Prior art techniques exist that focus on three-dimensional (3-D) surfaces and extracts NURBS features from a 3-D surface to form a few two-dimensional (2-D) arrays. Through DCT-domain embedding in these virtual images, a watermark is embedded into the 3-D NURBS surfaces. The technique of Praun, et al., "Robust Mesh Watermarking", *ACM Proc. Comput. Graphics*, pp. 49-56, 1999, employs a different domain for 3-D surfaces through multi-resolution mesh modeling and embeds a spread spectrum watermark by perturbing the mesh vertices along the direction of the surface normal. Registration techniques for 3-D NURBS surfaces, such as that of Ko, et al., "Shape Intrinsic Fingerprints for Free-form Object Matching", *Proc. 8th ACM Symp. Solid Modeling Appl.*, pp. 196-207, 2003, may be employed to facilitate the alignment of the test surfaces with the original reference surface prior to watermark detection. However, these prior art methods do not provide robustness against curve format conversions and D/A-A/D conversions, or address collusion resistance and traitor tracing by the application of hidden data in curves.

SUMMARY OF THE INVENTION

The present invention is a robust curve watermarking method of images and may be applied to watermarking or fingerprinting maps without interfering with the geospatial meanings conveyed by the map. In certain embodiments, B-spline control points of curves are selected as the feature domain mutually independent, noise-like sequences are added as digital fingerprints to the coordinates of the control points. A proper set of B-spline control points forms a compact collection of salient features representing the shape of the curve, which is analogous to the perceptually significant components in continuous-tone image. The shape of curves is also invariant to such challenging attacks as printing-and-scanning and vector/raster-raster/vector conversions. The additive spread spectrum embedding and the corresponding correlation-based detection generally provide a good tradeoff between imperceptibility and robustness, especially when the original host signal is available to the detector, as in most of the fingerprinting applications. To determine the presence of one or more fingerprint sequences in a test curve, registration with the original unmarked curve is, in certain embodiments, implemented as a preprocessing step. B-splines have invariance to affine transformations in that the affine transformation of a curve is equivalent to the affine transformation of its control points. This affine invariance property of B-splines can facilitate automatic curve registration. Meanwhile, as a curve can be approximated by different sets of B-spline control points, an iterative alignment-minimization (IAM) algorithm is provided to simultaneously align the curves and identify the corresponding control points with high precision. Through the B-spline based data hiding as well as the IAM algorithm for robust fingerprint detection, the curve watermarking technique of the present invention can sustain a number of challenging attacks, such as collusion, cropping, geometric transformations, vector/raster-raster/vector conversions, and printing-and-scanning and is therefore capable of building collusion-resistant fingerprinting for maps and other curve-based documents.

In a first aspect of the invention, a method is provided for concealing data in an image. A numerical model is provided that is operable to produce a curve responsive to a plurality of parameters provided thereto. A plurality of numerical values representative of the data to be hidden is selected and at least one original curve is selected from the image. A plurality of first parameters is determined such that the model produces the first curve responsive thereto. Each of the plurality of values is added to a corresponding one of the first parameters to produce a plurality of second parameters, which are provided to the model to form a marked curve. The original curve is replaced in the image by the marked curve.

In another aspect of the invention, a method is provided for conveying information through data concealed in an image. A numerical model is provided that is operable to produce a curve responsive to a plurality of parameters provided thereto. A plurality of numerical values representative of the data is selected and at least one original curve in the image is selected. A plurality of first parameters is determined such that the model produces the original curve responsive thereto. Each of the values is added to a corresponding one of the first parameters to produce a plurality of second parameters, which are provided to the model to form a marked curve. The original curve is replaced in the image by the marked curve. A plurality of third parameters is determined such that the model produces the marked curve responsive thereto. Each of the plurality of values is determined from a difference between the first parameter and the third parameter.

In yet another aspect of the invention, a method is provided for marking an image for identifying authorized possession thereof. A numerical model is provided that is operable to produce a curve responsive to a plurality of parameters provided thereto. Each of a plurality of identification codes is assigned to a corresponding entity authorized to possess the image and a plurality of numerical values representative of one of said identification codes is selected. At least one original curve is selected from the image. A plurality of first parameters is determined such that the model produces the original curve responsive thereto. Each of the plurality of values is added to a corresponding one of the plurality of first parameters to produce a plurality of second parameters, which are provided to the model to form a marked curve. The original curve is replaced in the image by the marked curve. A plurality of third parameters is determined such that the model produces the produces a test curve (which may be a marked curve corrupted by noise and other distortions) responsive thereto. Each of the plurality of values is determined from a difference between the first parameter and the third parameter and the identification code is assembled from the retrieved values. The identity of the entity assigned the identification code can then be determined.

BRIEF DESCRIPTION OF THE DRAWINGS

FIGS. 6A-6C illustrate curve registration by IAM in accordance with the present invention;

DETAIL DESCRIPTION OF PREFERRED EMBODIMENTS

Figure 1:
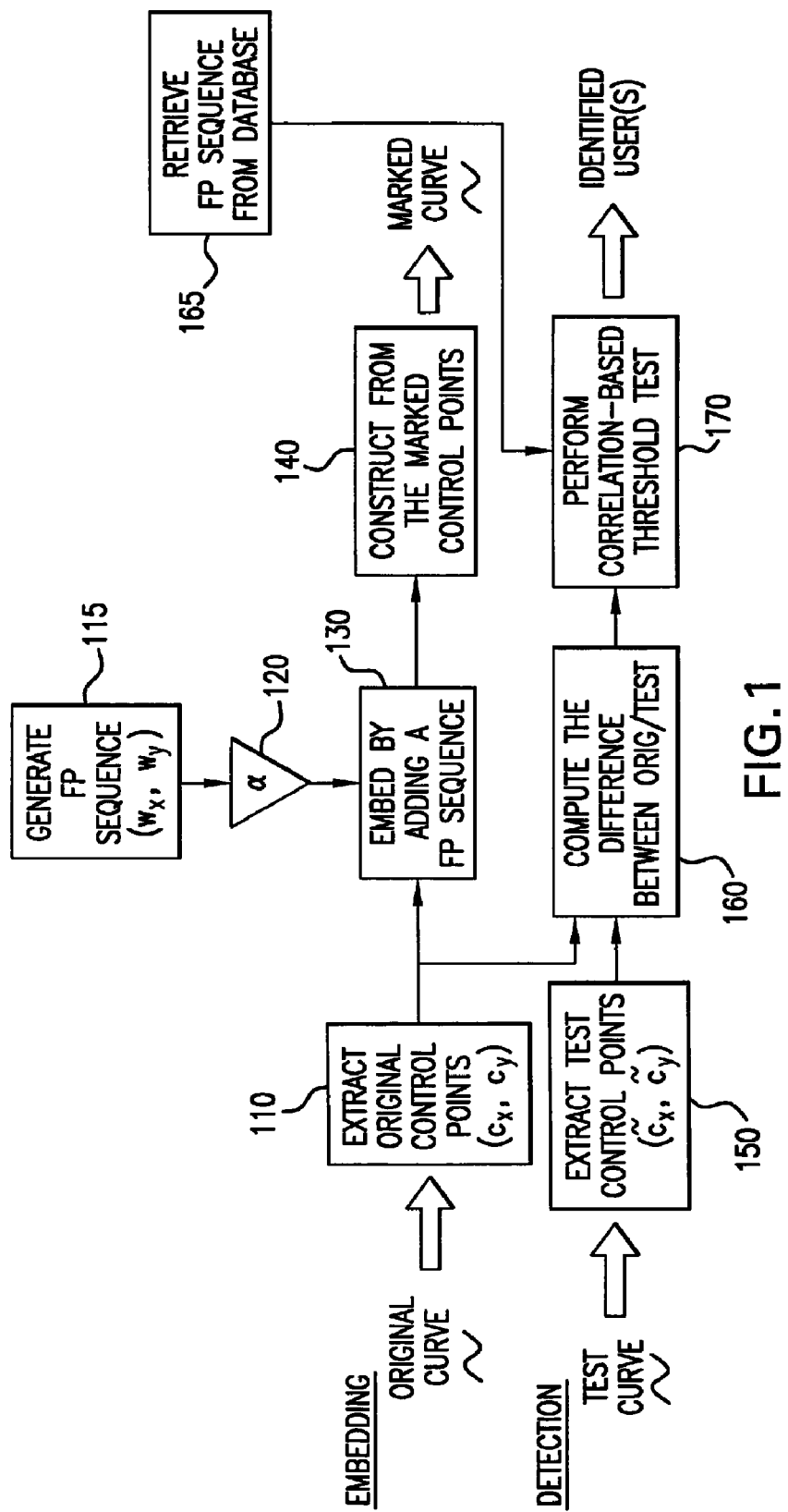
FIG. 1 is a block diagram illustrating process flow and fundamental functional components of embodiments of the present invention.

Aspects of the present invention are directed to manipulating the controlling parameters that define the structure of one or more curves in an image. As will be shown, the controlling parameters may be coordinates of the control points of B-spline curve segments, to which values representative of the data to be concealed are added. Although exemplary embodiments described below utilize certain fingerprint data as the data to be hidden in the curves, the invention is applicable to other data not specifically described. Thus, the invention is not limited to curves of any specific type of image nor is it limited to any specific data that may be concealed thereby.

Furthermore, it is to be noted that the term "image" is used herein to refer to a broad class of data structures. That is to say, that while the present invention is applicable to images in hard copy documents and images displayed on a display device, the term as used herein is also intended to refer to data structures that may not be rendered in such a way as to be visible in the traditional sense to a human observer. The term "image" is used herein to describe any data structure that contains a curve, whether that curve is explicitly rendered or not.

B-splines are piecewise polynomial functions that provide local approximations of curves using a small number of parameters known as the control points. Let $\{p(t)\}$ denote a curve, where $p(t)=(p_x(t), p_y(t))$ and t is a continuous indexing parameter. Its B-spline approximation $\{p^{[B]}(t)\}$ can be written as $$p^{[B]}(t) = \sum_{i=0}^{n} c_i B_{i,k}(t), \quad (1)$$

where t ranges from 0 to n−1, $c_i=(c_{x_i}, c_{y_i})$ is the i-th control point (i=0, 1, ... n), and $B_{i,k}(t)$ is the weight of the i-th control point for the point $p^{[B]}(t)$ and is also known as the k-th order B-spline blending function. $B_{i,k}(t)$ is recursively defined as $$B_{i,1}(t) = \begin{cases} 1, & t_i \leq t \leq t_{i+1} \\ 0, & \text{otherwise} \end{cases} \quad (2)$$

$$B_{i,k}(t) = \frac{(t - t_i)B_{i,k-1}(t)}{t_{i+k-1} - t_i} + \frac{(t_{i+k} - t)B_{i+1,k-1}(t)}{t_{i+k} - t_{i+1}}$$

$$k = 2, 3, \ldots ,$$

where $\{t_i\}$ are parameters known as knots and represent locations where the B-spline functions are tied together. The placement of knots controls the form of B-spline functions and in turn the control points.

The number of B-spline control points necessary to represent a curve to a desired precision can be much smaller than the number of points that can be sampled from the curve. Thus, given a set of sample points on the curve, certain embodiments of the invention determine a smaller set of control points for its B-spline approximation by minimizing the least-squares approximation error to the original curve. To that end, coordinates of m+1 samples on the curve are represented as an (m+1)×2 matrix $$P = \begin{bmatrix} p_0 \\ p_1 \\ \vdots \\ p_m \end{bmatrix} = \begin{bmatrix} p_{x_0} & p_{y_0} \\ p_{x_1} & p_{y_1} \\ \vdots & \vdots \\ p_{x_m} & p_{y_m} \end{bmatrix} \triangleq (p_x, p_y). \quad (3)$$

The indexing values of the B-spline blending functions corresponding to these m+1 samples are $t=s_0, s_1, \ldots, s_m$ where $s_0 < s_1 < \ldots < s_m$. Further, let C represent a set of n+1 control points $$C = \begin{bmatrix} c_0 \\ c_1 \\ \vdots \\ c_n \end{bmatrix} = \begin{bmatrix} c_{x_0} & c_{y_0} \\ c_{x_1} & c_{y_1} \\ \vdots & \vdots \\ c_{x_n} & c_{y_n} \end{bmatrix} \triangleq (c_x, c_y). \quad (4)$$

Then, the least-squares solution is that of $$\min_C \|BC - P\|^2 \Rightarrow C = (B^T B)^{-1} B^T P = B^\dagger P \quad (5)$$

where $\{B\}_{ji}$ is the value of the k-th order B-spline blending function $B_{i,k}(t)$ in Eq. (2) evaluated at $t=s_j$ for the i-th control point and † denotes the pseudo inverse of a matrix. Because of the natural decoupling of the x and y coordinates in the B-spline representation, the solution can be found separately along the axes of each of the two coordinates as $$\begin{cases} \min_{c_x} \|Bc_x - p_x\|^2 \\ \min_{c_y} \|Bc_y - p_y\|^2 \end{cases} \Rightarrow \begin{cases} c_x = B^\dagger p_x \\ c_y = B^\dagger p_y \end{cases}. \quad (6)$$

In certain embodiments of the invention, mutually independent, noise-like sequences similar to those of spread spectrum signal processing are used as digital fingerprints to represent different users/IDs for tracing and tracking purposes. Referring to FIG. 1, the exemplary embodiment of each of the n+1 control points is extracted at block 110 has two coordinate values x and y, the overall length of the fingerprint sequence corresponding thereto is 2(n+1). A fingerprint sequence $(w_x, w_y)$ is generated at block 115, is scaled at block 120, and added to the coordinates of a set of control points $(c_x, c_y)$ at block 130 to produce watermarked control points $(c'_x, c'_y)$, i.e., $$\begin{cases} c'_x = c_x + \alpha w_x \\ c'_y = c_y + \alpha w_y \end{cases} \quad (7)$$

where the scaling factor α adjusts the fingerprint influence on the curve. A watermarked curve can then be constructed according to the B-spline synthesis of Eq. (1) using the resulting watermarked control points $(c'_x, c'_y)$ as indicated at block 140.

To determine the presence of any fingerprint sequence in a test curve, registration of curve data may be performed using as a reference the original unmarked curve, which is described further below. Typically, the unmarked curve data is available to a detector in fingerprinting applications. After registration, control points $(\tilde{c}_x, \tilde{c}_y)$ are extracted from the test curve as shown at block 150. The accurate registration and correct extraction of control points are beneficial features provided by the present invention to the detection of fingerprints. Assuming we have the set of sample points given by $(\tilde{p}_x, \tilde{p}_y) = (B(c_x + \alpha w_x), B(c_y + \alpha w_y))$, the test control points $(\tilde{c}_x, \tilde{c}_y)$ may be extracted from $(\tilde{p}_x, \tilde{p}_y)$ using Eq. (6). After obtaining points $(\tilde{c}_x, \tilde{c}_y)$, the difference between the coordinates of the test and the original control points are computed at block 160 to arrive at an estimated fingerprint sequence $$\begin{cases} \tilde{w}_x = \frac{\tilde{c}_x - c_x}{\alpha} \\ \tilde{w}_y = \frac{\tilde{c}_y - c_y}{\alpha} \end{cases} \quad (8)$$

The estimated fingerprint sequence extracted from a test curve includes one or more sequences corresponding to one or more users as well as noise contributions resulting from distortion or attacks. The problem of determining which user(s) has(have) contributed to the estimated fingerprint can be formulated through, for example, hypothesis testing known in the art. For example, the similarity between the estimated fingerprint sequence and each fingerprint sequence in a database may be evaluated through a correlation-based statistic. In certain embodiments of the invention, the detection statistic is normalized to unity variance and to approximate a Gaussian distribution under distortions and attacks. There are several such techniques known in the art. For example, a correlation statistic may be normalized by the product of the standard deviation of the noise and the watermark's $L_2$ norm.

A nonlinear function of the sample correlation coefficient described in mathematical statistics literature was introduced to the watermarking community by Stone, et al., "Analysis of Attacks on Watermarks with Randomized Coefficients", *NEC Res. Inst. Tech. Rep.* 96-045, 1996, which is now often referred to as the Fisher's Z statistic. The Z statistic shows excellent robustness against different collusion attacks and does not require the explicit estimation of the variance of the noise. The Z statistic originated from the statistical problem of obtaining independent and identically distributed (i.i.d.) samples from a pair of random variables that are jointly Gaussian distributed, with correlation coefficient ρ unknown to the observers. Let r be the sample correlation coefficient computed from L pairs of sample data, and $-1 \leq r \leq 1$. The function of r $$\frac{1}{2} \log \frac{1+r}{1-r}$$

has been shown to asymptotically follow a normal distribution when $L \to \infty$, and the distribution has a mean approximating $(\frac{1}{2}) \log((1+\rho)/(1-\rho))$ and a variance approximating $1/(L-3)$. The Z statistic defined below follows a unit-n variance Gaussian distribution $$Z \triangleq \frac{\sqrt{L-3}}{2} \log \frac{1+r}{1-r} \sim N\left(\frac{\sqrt{L-3}}{2} \log \frac{1+\rho}{1-\rho}, 1\right). \quad (9)$$

The approximation of Eq. (9) has proven to provide excellent results with as few as ten pairs of samples.

In the control-point domain of the present invention, the effective number of samples for computing the statistic is for example, $L=2(n+1)$. Denoting the average values of the components in $\tilde{w}$ and w as $\tilde{\mu}$ and μ, respectively, the sample correlation coefficient r between $\tilde{w}$ and w may be computed by $$r = \frac{\sum_{i=1}^{L} (\tilde{w}_i - \tilde{\mu})(w_i - \mu)}{\sqrt{\sum_{j=1}^{L} (\tilde{w}_j - \tilde{\mu})^2 \sum_{k=1}^{L} (w_k - \mu)^2}}. \quad (10)$$

The corresponding components of an extracted fingerprint in question and a particular user's fingerprint may be considered as i.i.d. samples from a bivariate normal population. When the extracted fingerprint does not have the user's contribution, as determined from the sequence retrieved from the database, as shown in block 165, the expected correlation coefficient is zero, and the Z statistic will approximate a Gaussian distribution with a zero mean and a unit variance. When the fingerprint has the user's contribution, the Z statistic will have a large positive mean determined by the correlation coefficient ρ. To derive the expression for ρ, a random variable $Y \triangleq W + N$ may be defined and the extracted fingerprint consists of i.i.d. samples from Y. W may be a zero-mean Gaussian random variable representing the user's fingerprint, and N is a zero-mean Gaussian random variable representing noise. The correlation coefficient of this bivariate normal population (W, y) is $$\rho = \frac{\text{cov}(W, Y)}{\sqrt{\text{var}(W)\text{var}(Y)}} \quad (11)$$

$$= \frac{\text{var}(W) + \text{cov}(W, N)}{\sqrt{\text{var}(W)[\text{var}(W) + \text{var}(N) + 2\text{cov}(W, N)]}}$$

When W and N are uncorrelated, the correlation coefficient becomes $$\rho = \sqrt{\frac{\operatorname{var}(W)}{\operatorname{var}(W)+\operatorname{var}(N)}} = \sqrt{\frac{1}{1+\frac{1}{WNR}}} \quad (12)$$

where the watermark-to-noise ratio $WNR \triangleq (\operatorname{var}(W)/\operatorname{var}(N))$. The distribution of the Z statistics is then known in the presence and absence of the user's fingerprint, and the probabilities of detection $P_d$ and false alarm $P_{fa}$ may be determined for different decision thresholds. For example, a threshold of 3 results in a false alarm probability on the order of $10^{-3}$, while a threshold of 6 corresponds to the order of $10^{-9}$. The correlation test, indicated at block 170, identifies the user whose fingerprint is embedded on the test curve.

Effective collusion resistance is a defense against different users manipulating copies of the same content in the possession of each traitor to remove the respective embedded IDs therefrom. A collusion-resistant coded fingerprint implementation requires that each code symbol be reliably embedded, thus consuming a nontrivial number of markable features per embedded bit. The markable feature for the curve watermarking of the present invention is, in the exemplary embodiment, the coordinates of control points. As the number of control points is limited and the changes thereto should be made small, orthogonal modulation that implements orthogonal signals to represent different users is preferred to other possible coding techniques of the prior art. It has been shown in previous studies that the maximum number of colluders that the system can resist is a function of the watermark-to-noise ratio, the number of markable features, the total number of users, as well as the false positive and negative threshold margins.

In certain embodiments of the invention, a pseudo-random number generator is used to produce a sequence of independent random numbers as a fingerprint and uses different seeds for different users. In this way, the actual fingerprints are statistically uncorrelated, but may have a nonzero correlation. Such correlation can accommodate a larger number of fingerprint vectors than the vector's dimension, but it also affects the detection performance to some degree. Since the correlation is very low between the independent fingerprints, the impact has been shown to be small.

To ensure that the B-spline synthesized curves are close to the original curve as possible, the knots connecting adjacent segments of B-splines should be prudently placed, and the sampling points should be properly chosen so as to be compatible with the least-squares estimator for the control points. In certain embodiments, uniform sampling can be used when there are no abrupt changes in a curve segment, while nonuniform sampling is desirable for curve segments that exhibit substantial variations in curvature. The curvature of a point $p(t)=(p_x(t),p_y(t))$ on a curve $\{p(t)\}$ may be defined as $$k(t) \triangleq \frac{p'_x p''_y - p'_y p''_x}{(p'^2_x + p'^2_y)^{3/2}} \quad (13)$$

where $p'_x = dp_x/dt, p''_x = d^2 p_x/dt^2$, $p'_y = dp_y/dt$ and $p''_y = d^2 p_y/dt^2$. In many practical implementations of the invention the curvature is approximated at each point on the curve by measuring the angular change in the tangent line at its location. For example, a 1$^{st}$-order polynomial curve fitting may be applied on an l-pixel interval before and after the curve point p (t) to get two slopes, $k_1$ and $k_2$. The approximate curvature $\hat{k}(t)$ may then be computed by $\hat{k}(t)=|\arctan(k_1)-\arctan(k_2)|$. As determined from $\hat{k}(t)$, more sample points may be selected from higher-curvature segments and fewer sample points may be selected from lower-curvature segments.

After selecting m+1 sample points and assembling them as $(p_x,p_y)$, as defined in Eq. (3), the indexing values $t=s_0, s_1, s_2, \ldots, s_m$ are determined at the sample points, which will be used to evaluate their B-spline blending function values $B_{i,k}(t)$. In certain embodiments of the invention, the uniform nonperiodic B-spline blending function of order k=3, and the knot parameters $\{t_i\}$ are determined as $[t_0, t_1, \ldots, t_{n+3}]=[0, 0, 0, 1, 2, 3, \ldots, n-2, n-1, n-1, n-1]$. In other embodiments of the indexing-value assignment, known as the chord-length method, t values of the sample points are increased in proportion to the chord length $$s_j = s_{j-1} + \|p_j - p_{j-1}\| \frac{n-1}{\sum_{i=1}^{m} \|p_i - p_{i-1}\|} \quad (14)$$

$$j = 1, 2, \ldots, m$$

where $s_0=0$ and $\|p_j - p_{j-1}\|$ denotes the chord length between points $p_j$ and $p_{j-1}$.

In the case of vector curves, a set of discrete, nonuniformly spaced points for each curve is provided. Since a vector curve can be rendered as a raster curve by interpolation, sample points and corresponding indexing values of a vector curve may be determined by rendering into a raster curve and then performing the curvature-based sampling and the chord-length method, as described above. In an alternative method the given discrete points are directly used as sample points, but their indexing values are assigned according to a curvature-based rule. For example, the curvature of each sample point $(p_x(s_j),p_y(s_j))$ may be approximated by $$\hat{k}(s_j) = \left|\arctan\frac{p_y(s_{j+1})-p_y(s_j)}{p_x(s_{j+1})-p_x(s_j)} - \arctan\frac{p_y(s_j)-p_y(s_{j-1})}{p_x(s_j)-p_x(s_{j-1})}\right| \quad (15)$$

The values of t of the sample points are increased in inverse proportion to their curvature; the higher the curvature, the smaller the increase in the t value. This is equivalent to having more control points for higher-curvature segments. With more "resources" in terms of B-spline control points assigned to segments with more details (i.e., higher curvature segments), improved B-spline approximation is provided.

The number of control points is an important parameter for tuning in that depending on the shape of the curve, using too few control points may cause the details of the curve to be lost, while using too many control points may lead to introducing artifacts before data embedding. One method of determining the number of control points in accordance with the invention is to compute the approximate curvature of each sample point as in Eq. (15) and assign higher weights to points with higher curvature. The number of control points may then be determined according to the total weights of all sample points on the curve. In many applications, the number of control points is approximately 5-8% of the total number of curve pixels.

The scaling factor $\alpha$ also affects the invisibility and robustness of fingerprints. The larger the scaling factor is, the more robust the fingerprint is, but greater distortion is produced. For cartographic applications, industrial standards provide guidelines on the maximum allowable changes. Perturbation of two to three pixels is usually considered acceptable. Random number sequences with a unit variance as fingerprints and $\alpha$ set to 0.5 has shown to comply with standards as well as provide adequate robustness.

The difference between two curves can be quantified using such max-min metrics as the Hausdorff distance known in the art. Let d (a,b) be the distance between two points a and b, which are on two curves A and B, respectively. The distance from point a to curve B is defined as $d(a,B) \triangleq \inf_{b \in B} d(a,b)$, and the distance from curve A to curve B is defined as $d_B(A) \triangleq \sup_{a \in A} d(a,B)$. The Hausdorff distance between curve A and B is then $$h(A,B) \triangleq d_B(A) + d_A(B). \tag{16}$$

The fingerprint detection process previously described makes use of the original unmarked copy and is thus known as nonblind detection. Blind detection is preferred for some major data hiding applications (such as ownership verification, authentication, and annotation), but nonblind detection techniques are preferred for many fingerprinting applications. Nonblind detection is preferred because fingerprint verification is usually handled by the content owner or by an authorized central server, who can have access to the original host signal and use it to detect the origin of the fingerprint in a suspicious document. The availability of the original unmarked copy in the detection gives a high equivalent watermark-to-noise ratio, thus allowing for high resistance against noise and attacks. Additionally, using the original unmarked copy as a reference copy, the detector can register a test copy that suffers from geometric distortions, which provide resilience to various geometric transformations as will be described below.

Figure 2A:
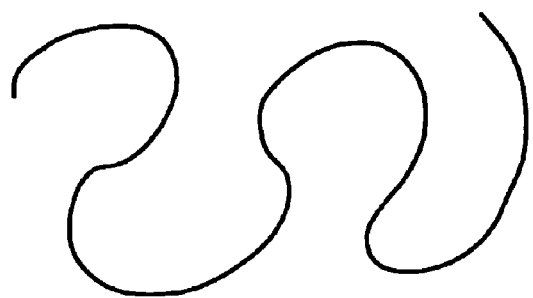
FIGS. 2A-2B are line drawings respectively illustrating an original curve and a curve fingerprinted in accordance with the present invention.
Figure 2B:
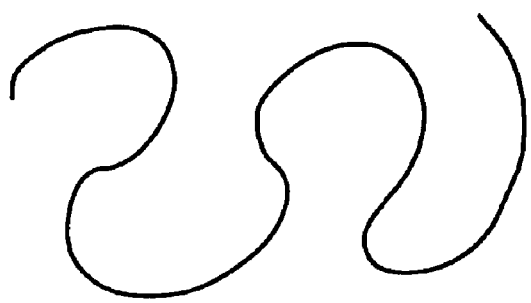

To demonstrate the effectiveness of the basic embedding and detection algorithms of the present invention, FIG. 2A illustrates a curve that was hand-drawn on a Tablet PC and stored as binary image of size 521×288. A contour following algorithm known in the art was used to traverse the curve and obtain a set of ordered curve points. Uniform sampling on the curve points was conducted and the indexing values of the sample points were determined using the chord-length method. The fingerprinted curve is shown in FIG. 2B which was constructed with the same number of points as the original curve by evaluating the B-spline synthesis formula of Eq. (1) at indexing values uniformly sampled between t=0 and t=n−1. As for the fidelity of the fingerprinted curve, the Hausdorff distance between the original and marked curve is 3.4. The differences are hardly visible to the human eye.

Figure 2C:
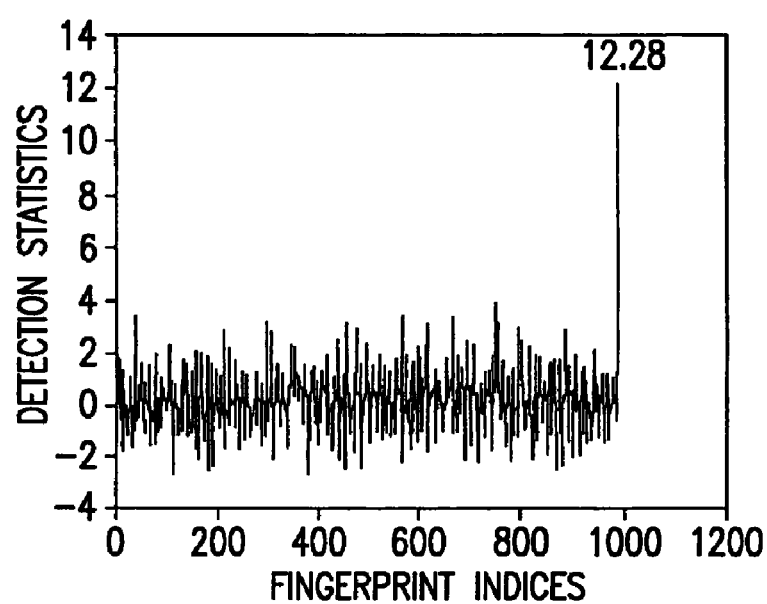
FIG. 2C is a graph of a detection statistic of data concealed in the fingerprinted curve of FIG. 2B.

In the detection process, the fingerprinted curve constructed above is utilized as a test curve and uniform sampling is applied thereto to obtain an approximation of the set of sample points $(\tilde{p}_x, \tilde{p}_y) = (B(c_x + \alpha w_x), B(c_y + \alpha w_y))$ described above. The test control points are provided to the correlation-based detection process. The detection results on the fingerprinted curve are shown in FIG. 2C, which illustrates a high Z value for the correct positive detection with the $1000^{th}$ sequence corresponding to the true user, and very small Z statistics for the correct negative detection with other sequences of innocent users.

Figure 3A:
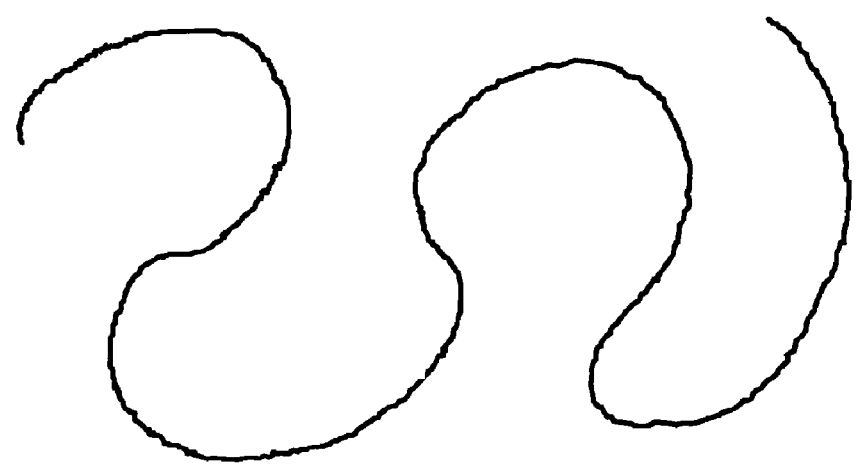
FIG. 3A is a line drawing of a printed and scanned curve that has been fingerprinted in accordance with the present invention.
Figure 3B:
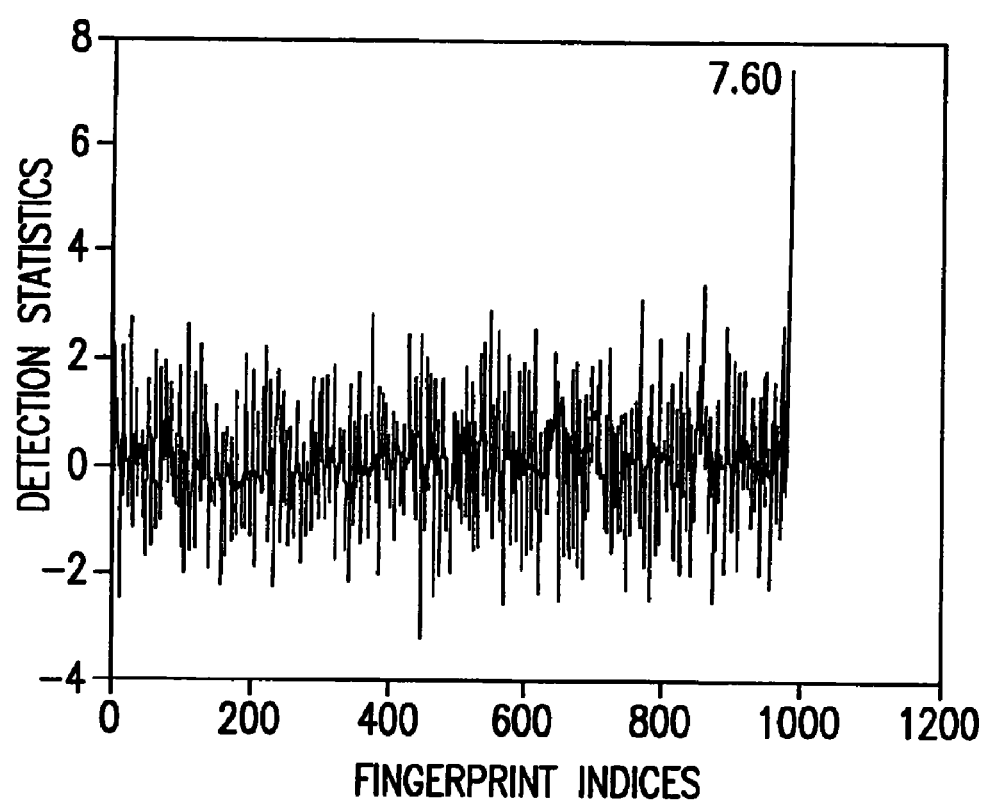
FIG. 3B is a graph of a detection statistic of data concealed in the fingerprinted curve of FIG. 3A.

Referring to FIGS. 3A-3B, printing-and-scanning resiliency of the present invention is demonstrated. Registration between the scanned fingerprinted curve and the original unmarked curve was accomplished manually. The fingerprinted curve was printed on a laser printer and scanned back as a 527×288 binary image, as shown in FIG. 3A. In addition to registration, certain embodiments of the invention perform a thinning operation on the curve to extract a one-pixel-wide skeleton from the scanned curve that is usually several pixels wide after high-resolution scanning. The detection results are shown in FIG. 3B, where it can be observed that, despite the curve being simple and the number of control points being relatively small, the fingerprint survives the printing-an-scanning process and gives a detection statistic higher than the detection threshold.

In certain embodiments of the invention, a step preceding the basic fingerprint detection module is provided to align the test curve with the original. While the manual registration previously demonstrated is one way to compensate for simple geometric distortions, automated registration is more desirable in that both accuracy and efficiency are improved thereby. A test curve should be registered with the original unmarked curve, and any "clean/undistorted" fingerprinted copies known to the detector should not be used as a reference for registering the test curve. This is not only to allow a determination of fingerprints are present in the test curve, but also because using a fingerprinted copy as a reference for registration may increase the false alarm probability in determining the presence or absence of a particular fingerprint.

In that B-splines possess an affine invariance property, they have been previously used in curve alignment prior art. However, there is also an inherent nonuniqueness of B-spline control points, which refers to the fact that the same curve can be effectively approximated by more than one different set of B-spline control points. Thus, it is possible for the difference between two sets of unmarked control points to be much larger than the embedded fingerprint sequence. Thus, if the set of control points from a test curve do not correspond to the set used for embedding, the fingerprint sequence may not be resoluble. Considering the one-to-one relationship between sample points (including their indexing values $\{s_j\}$) and control points, a search is conducted for the set of sample points from a test curve that corresponds to the set of sample points used in the embedding. This will be referred to herein as the point correspondence problem.

In the following discussions, the term "View-I" will refer to the geometric configuration of the original unmarked curve and the term "View-I" to refer to the configuration of the test curve. The two curves can be registered by transforming the test curve from "View-II" to View-I" or transforming the original curve from "View-I" to "View-II."

Under affine transformations, each point (x, y) on one curve may be transformed to a corresponding point $(\tilde{x}, \tilde{y})$ on another curve via $$\begin{bmatrix} \tilde{x} \\ \tilde{y} \end{bmatrix} = \begin{bmatrix} a_{11} & a_{12} \\ a_{21} & a_{22} \end{bmatrix} \begin{bmatrix} x \\ y \end{bmatrix} + \begin{bmatrix} a_{13} \\ a_{23} \end{bmatrix} \tag{17}$$

where $\{a_{ij}\}$ are parameters representing the collective effect of scaling, rotation, translation, reflection and shearing. The transform parameters can also be represented in a homogeneous coordinate by two column vectors $a_x$ and $a_y$, or by a single matrix A:

$$\begin{bmatrix} \tilde{x} \\ \tilde{y} \\ 1 \end{bmatrix} = \begin{bmatrix} a_{11} & a_{12} & a_{13} \\ a_{21} & a_{22} & a_{23} \\ 0 & 0 & 1 \end{bmatrix} \begin{bmatrix} x \\ y \\ 1 \end{bmatrix} \tag{18}$$

-continued $$= \begin{bmatrix} a_x^T \\ a_y^T \\ 0 \quad 0 \quad 1 \end{bmatrix} \begin{bmatrix} x \\ y \\ 1 \end{bmatrix} = A \begin{bmatrix} x \\ y \\ 1 \end{bmatrix}.$$

Similarly, the inverse transform can be represented by $$\begin{bmatrix} x \\ y \\ 1 \end{bmatrix} = A^{-1} \begin{bmatrix} \tilde{x} \\ \tilde{y} \\ 1 \end{bmatrix} \triangleq \begin{bmatrix} g_x^T \\ g_y^T \\ 0 \quad 0 \quad 1 \end{bmatrix} \begin{bmatrix} \tilde{x} \\ \tilde{y} \\ 1 \end{bmatrix}. \quad (19)$$

The original curve available to the detector in fingerprinting applications can be a raster curve or a vector curve. It is assumed that the detector knows the original set of sample points $(p_x, p_y) \approx (Bc_x, Bc_y)$ used for estimating the set of control points on which data embedding is applied. The test curve can be a vector curve with sampled curve points $(\tilde{v}_x, \tilde{v}_y)$ or a raster curve with pixel coordinates $(\tilde{r}_x, \tilde{r}_y)$. To demonstrate relatively simple case for purposes of description, assume for a moment that the set of discrete points in a test vector curve corresponds to the set of sample points used in the embedding, except with possible affine transformations and noise addition. Under this assumption, the test vector points $(\tilde{v}_x, \tilde{v}_y)$ and the original set of control points $(c_x, c_y)$ are related by $$\begin{cases} \tilde{v}_x = [B(c_x + \alpha w_x) \quad B(c_y + \alpha w_y) \quad 1]a_x + n_x \\ \tilde{v}_y = [B(c_x + \alpha w_x) \quad B(c_y + \alpha w_y) \quad 1]a_y + n_y \end{cases} \quad (20)$$

where $(n_x, n_y)$ represents additional noise applied to the transformed fingerprinted vector points, and 1 is a column vector with all 1s. With the point correspondence known, the only issue is curve alignment, which can be achieved by directly applying any of many known curve alignment methods. However, in addition to possible affine transformations between the original and the test curves, the correct point correspondence information may not always be available. This is especially the case after a fingerprinted curve undergoes vector-raster conversions and/or printing-and-scanning. In these situations, both transform parameters for the curve alignment and point correspondence must be estimated in order to locate the fingerprinted control points successfully.

Figure 4:
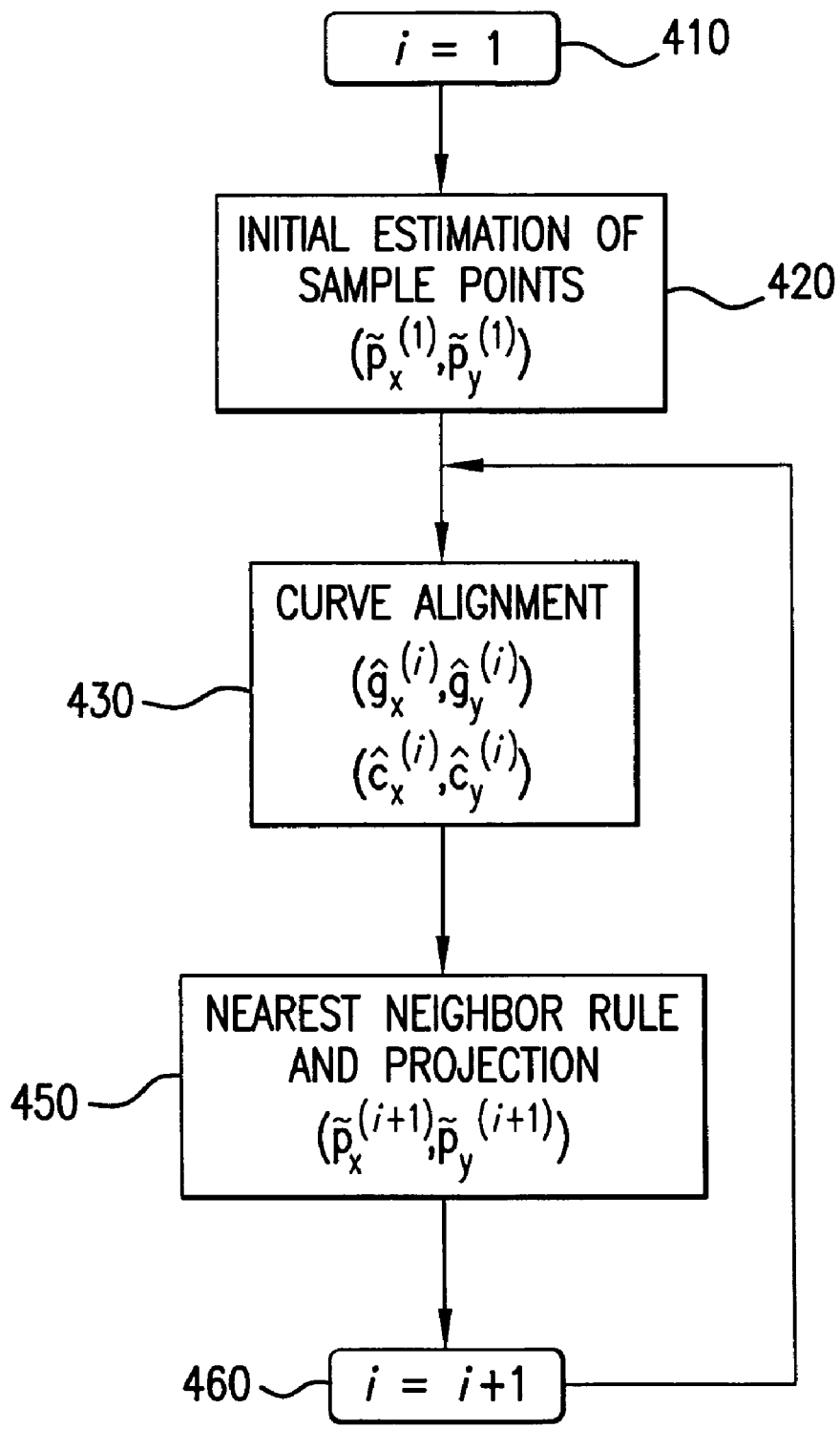
FIG. 4 is a flow diagram illustrating fundamental processing steps of an iterative alignment-minimization algorithm (IAM) in accordance with the present invention.
Figure 5:
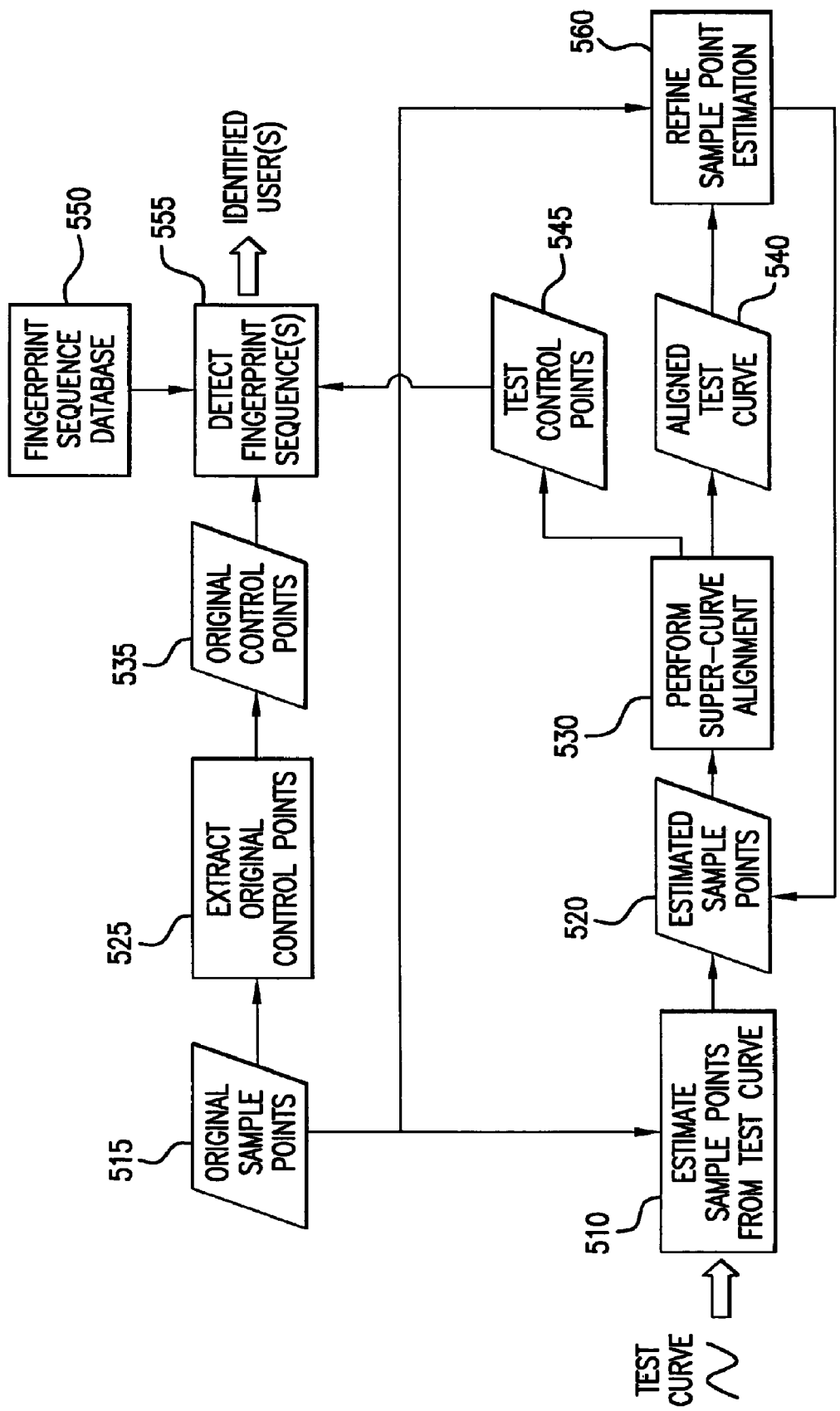
FIG. 5 is a block diagram illustrating process flow and fundamental functional components of embodiments of the present invention implementing IAM.

In certain embodiments of the invention, an iterative alignment-minimization algorithm (IAM) is used to align the test curves with the original curves while concurrently identifying the point correspondence of the sample points. As shown in FIG. 4 and FIG. 5, an IAM algorithm consistent with the present invention is composed of three main steps, where the latter two steps are executed iteratively. First, an initial estimation of the test sample point is obtained. When point correspondence has been estimated, curve alignment is performed to estimate concurrently both the transform parameters and the control points of the test curve. Curve alignment may be achieved by fitting a B-spline to the superimposed curves and minimizing the fitting error. Once the transform parameters have been estimated, the estimation of point correspondence is refined through a nearest-neighbor rule.

As shown in FIG. 4, a loop index i is initialized in block 410. Thus, at block 420, initial sample points $(\tilde{p}_x^{(1)}, \tilde{p}_y^{(1)})$ are selected from the test curve using the following simple estimator. Let M and $\tilde{M}$ be the number of points on the original and the test raster curves, respectively. From the known indices $J=[j_0, j_1, j_2, \ldots, j_m]$ of the original curve's m+1 sample points, where $j_0 < j_1 < j_2 < \ldots < j_m$ are integers ranging from 0 to M−1, the indices of the test curve's m+1 sample points are estimated by $\tilde{J}=\text{round}((\tilde{M}-1/M-1)\cdot J)$. Using this estimated index vector $\tilde{J}$, the corresponding sample points from the test curve are taken as the initial estimate.

In block 430, an attempt is made to align the curve with the estimated sample points. Given the estimated point correspondence with sample points $(\tilde{p}_x^{(i)}, \tilde{p}_y^{(i)})$ for the test curve in the i-th iteration, a curve alignment method such as that described in Xia, et al., "Image Registration by 'Supercurves'", *IEEE Trans. Image Process*, Vol. 13, no. 5, pp. 720-732, May 2004, is applied to estimate the transform parameters and the control points of the test curve. For example, the transform parameters from View-I (the original curve) to View-II (the test curve) are taken $(a_x^{(i)}, a_y^{(i)})$. The sample points on the test curve can be transformed back to View-I by $(g_x^{(i)}, g_y^{(i)})$ The transformed test sample points as well as the original sample points are fit with a single B-spline curve. A set of transform parameters $(\hat{g}_x^{(i)}, \hat{g}_y^{(i)})$ and B-spline control points $(\hat{c}_x^{(i)}, \hat{c}_y^{(i)})$ is sought that minimizes the fitting error $$f(\hat{c}_x^{(i)}, \hat{c}_y^{(i)}, \hat{g}_x^{(i)}, \hat{g}_y^{(i)}) = \quad (21)$$

$$\left\| \begin{bmatrix} B \\ B \end{bmatrix} \hat{c}_x^{(i)} - \begin{bmatrix} p_x \\ \tilde{P}^{(i)} \hat{g}_x^{(i)} \end{bmatrix} \right\|^2 + \left\| \begin{bmatrix} B \\ B \end{bmatrix} \hat{c}_y^{(i)} - \begin{bmatrix} p_y \\ \tilde{P}^{(i)} \hat{g}_y^{(i)} \end{bmatrix} \right\|^2,$$

where $\tilde{P}^{(i)} \triangleq [\tilde{p}_x^{(i)} \ \tilde{p}_y^{(i)} \ 1]$ and 1 is a column vector of all 1s. The partial derivatives of the fitting error function with respect to $\hat{g}_x^{(i)}, \hat{g}_y^{(i)}, \hat{c}_x^{(i)}$ and $\hat{c}_y^{(i)}$ being zero is the necessary condition for the solution to this optimization problem. Thus, we obtain an estimate of the transform parameters and the B-spline control points is obtained as $$\begin{cases} \hat{g}_x^{(i)} = C^{(i)} D^{(i)} p_x, & \hat{g}_y^{(i)} = C^{(i)} D^{(i)} p_y \\ \hat{c}_x^{(i)} = D^{(i)} p_x, & \hat{c}_y^{(i)} = D^{(i)} p_y \end{cases} \quad (22)$$

where $$\begin{cases} C^{(i)} \triangleq (\tilde{P}^{(i)T} \tilde{P}^{(i)})^\dagger \tilde{P}^{(i)T} B \\ D^{(i)} \triangleq (2B^T B - B^T \tilde{P}^{(i)} C^{(i)})^\dagger B^T. \end{cases}$$

The estimated control points $(\hat{c}_x^{(i)}, \hat{c}_y^{(i)})$ can then be used to estimate the fingerprint sequence and further compute the detection statistic $Z^{(i)}$, as described above.

From block 430, flow is directed to block 450 where refinement of the sample point estimation on the test curve is performed. Given the estimated transform parameters $(\hat{g}_x^{(i)}, \hat{g}_y^{(i)})$, the test raster curve $(\tilde{r}_x, \tilde{r}_y)$ is aligned with the original curve by transforming it to View-I $$\begin{cases} \tilde{r}_{x,l}^{(i)} = [\tilde{r}_x \ \tilde{r}_y \ 1] \hat{g}_x^{(i)} \\ \tilde{r}_{y,l}^{(i)} = [\tilde{r}_x \ \tilde{r}_y \ 1] \hat{g}_y^{(i)} \end{cases}. \quad (23)$$

As the fingerprinted sample points $(B(c_x+\alpha w_x), B(c_y+\alpha w_y))$ are located in the neighborhood of their corresponding unmarked version ($Bc_x, Bc_y$), a nearest-neighbor rule may be applied to refine the estimation of the test curve's sample points. For example, for each point of($Bc_x, Bc_y$), the closest point from the aligned test raster curve ($\tilde{r}_{x,I}^{(i)}, \tilde{r}_{y,I}^{(i)}$) to the point ($Bc_x, Bc_y$) is sought. The collection of these closest points is denoted as ($\tilde{p}_{x,I}^{(i+1)}, \tilde{p}_{y,I}^{(i+1)}$). These nearest neighbors form a refined estimate of the test sample points in View-I and are then transformed with parameters ($\tilde{a}_x^{(i)}, \tilde{a}_y^{(i)}$) back to View-II as a new estimate of the test sample points $$\begin{cases} \tilde{p}_x^{(i+1)} = [\tilde{p}_{x,I}^{(i+1)} \quad \tilde{p}_{y,I}^{(i+1)} \quad 1]\tilde{a}_x^{(i)} \\ \tilde{p}_y^{(i+1)} = [\tilde{p}_{x,I}^{(i+1)} \quad \tilde{p}_{y,I}^{(i+1)} \quad 1]\tilde{a}_y^{(i)} \end{cases}. \quad (24)$$

After this update, the index i is incremented at block 460 and flow is redirected back to block 430. The iteration will continue until predetermined convergence criteria have been met or until an empirically determined number of iterations have been performed.

FIG. 5 illustrates an exemplary embodiment of the detection process of the present invention with IAM implemented therein. At block 515, the sample points of the original curve are used to extract the original control points, in block 525, and are used to initialize the estimation of the sample points of a test curve, as described above, in block 510. The estimated sample points, indicated at block 520, are provided to the super-curve alignment procedure described above in block 530. The aligned test curve, indicated at block 540, is provided to the sample point estimation process, such as the nearest-neighbor process described above, in block 560. The refined sample points are fed back to the super-curve alignment of block 530 for the next iteration of the registration process.

The super-curve alignment process at block 530 provides a set of test control points, indicated at block 545. Upon reaching the predetermined convergence criteria, the test control points are compared with the original control points 535 to extract, as described above, the fingerprint sequence associated with the test curve, as shown in block 555. The fingerprint sequence can be compared to those in a database, as indicated at block 550, to determine the identity of the user.

Referring to FIG. 6A, there is shown an original curve and a fingerprint curve having undergone vector-raster conversion and geometric transformation. The original curve consists of 367 vector points, which are used as sample points to estimate a set of 200 control points for data embedding. Then, a fingerprinted curve with 367 vector points is generated, rendered to be a raster curve, and affinely transformed. After the vector-raster conversion, the point correspondence is no longer directly available from the raster curve representation. The IAM algorithm is applied to align the test curve with the original one and to estimate the correspondence between sample points. The estimated sample points for the test curve after one iteration and 15 iterations are shown in FIG. 6B and FIG. 6C, respectively. It is to be noted that, initially, the estimated values deviate from the true values by a nontrivial amount, whereas after 15 iterations, the estimated values converge on the true values.

The example above illustrates that through the present invention implementing IAM algorithm, test curves may be effectively registered with the original unmarked curve and the fingerprinted control points may be extracted with high accuracy. With good estimation of affine transform parameters, the data embedding method of the present invention is resilient to combinations of scaling, rotation, translation, and shearing. The explicit estimation of point correspondence also provides resilience to the vector-raster and vector-raster-vector conversions. In the vector-raster conversion case, a fingerprinted curve stored in vector format is rendered as a raster curve, and thus the point correspondence is no longer directly available from the raster curve representation. In the vector-raster-vector conversion case, the intermediate raster curve is converted to a vector curve with a new set of vector points that are likely to be different from the initial vector points prior to the conversion, even though there is little visual difference between these two vector curves. Again, the point correspondence is likely to be corrupted by the conversion, and accurate estimation of point correspondence becomes a significant step in the successful detection of the fingerprint. With robustness resulting from the spread spectrum embedding in B-spline control points and the IAM algorithm, the curve fingerprinting method of the present invention can resist a number of challenging attacks and distortions. For example, the distortion from printing-and-scanning involves both vector-raster rendering and a certain amount of rotation, scaling, and translation; a fingerprinted curve in vector format may be rendered as a raster image and then affinely transformed before reaching the detector; in the collusion scenario, colluders may construct a colluded copy, print it out, and then distribute it out of the allowed domain. The curve fingerprinting method of the present invention will now be demonstrated in the context of tracing and tracking topographic maps. A topographic map provides a two-dimensional representation of the earth's 3-D surface. Vertical elevation is shown with contour lines (also known as level lines) to represent the earth's surfaces that are of equal altitude. Contour lines in topographic maps often exhibit a considerable amount of variations and irregularities, prompting the need for nonuniform sampling of curve points in the parametric modeling of the contours. We will first examine the fidelity of the fingerprinted collusion, and then the robustness against cropping, geometric transformations, format conversions, point deletion, curve smoothing, printing-and-scanning, and some combinations of these distortions.

Figure 7A:
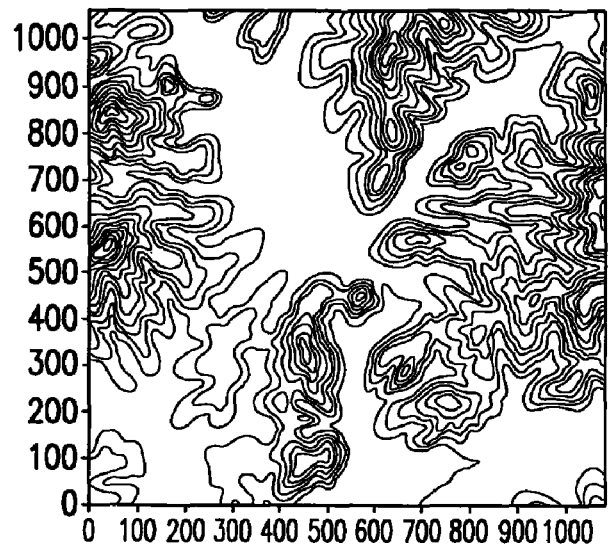
FIGS. 7A-7C are topographical chart sections having original contours overlaid with contours fingerprinted in accordance with the present invention.
Figure 7B:
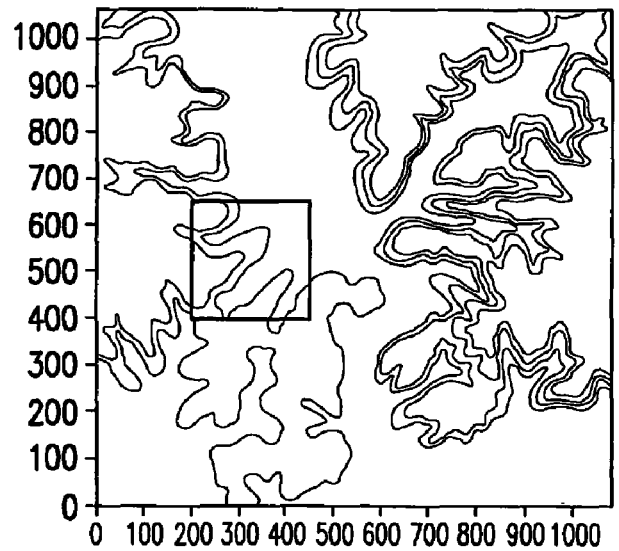
Figure 7C:
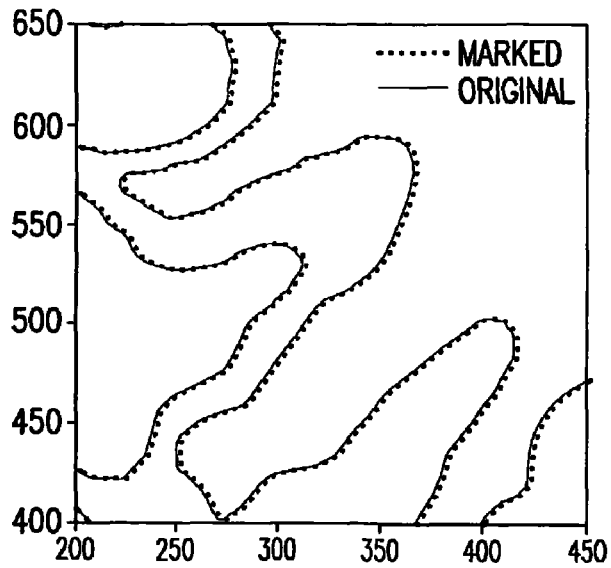

An 1100×1100 topographic vector map is shown in FIG. 7A. Nine curves that are sufficiently long for demonstration purposes are selected and for each of these nine curves, a set of nonuniformly spaced vector points is given by the original dataset. The vector points are used as sample points and their indexing values are determined according to the curvature-based rule presented above. In the exemplary embodiment, a total of 1331 control points are used to carry the fingerprint. As shown in FIG. 7B, the nine original curves and the corresponding marked curves are overlayed using solid lines and dotted lines, respectively. To help illustrate the fidelity of the inventive method, an enlarged portion of the overlaid image is shown in FIG. 7C. It can be observed that the fingerprinted map preserves the geospatial information in the original map with high precision. The perturbation can be adapted to be compliant with cartographic industry standards and/or the need of specific applications.

Figure 8A:
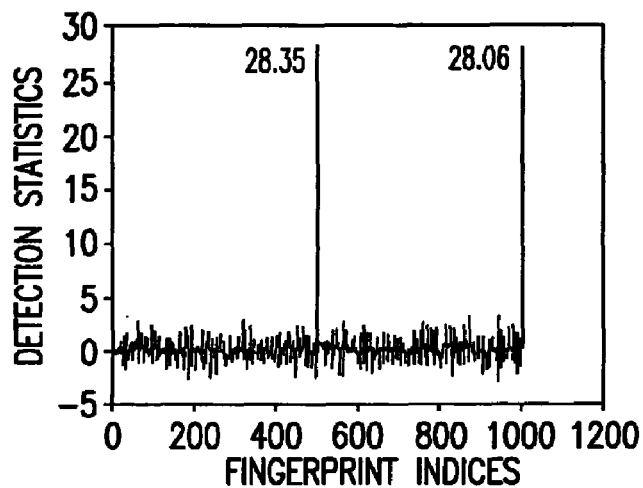
FIGS. 8A-8C are graphs of detection statistics of fingerprinted curves after attempts at bypassing the fingerprinting of the present invention by collusion.
Figure 8B:
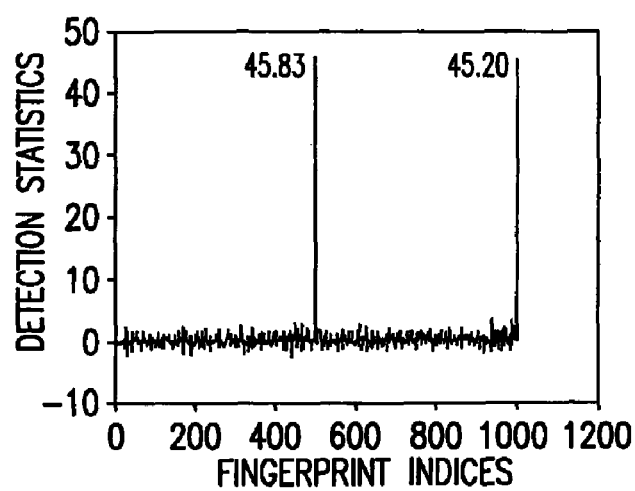
Figure 8C:
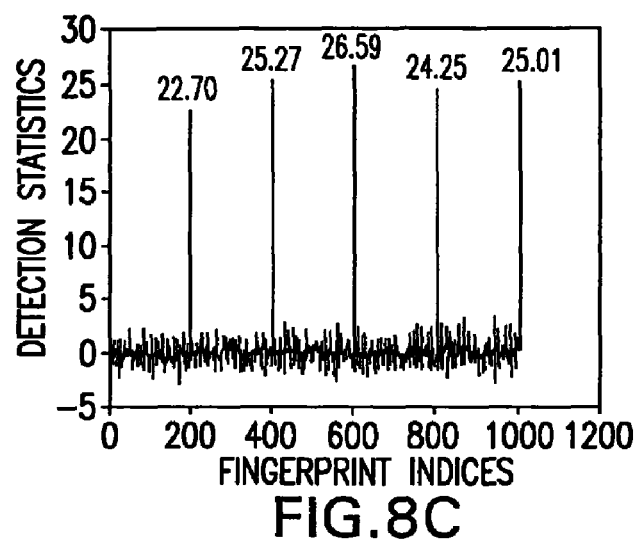

To demonstrate the resistance of the inventive method against collusion, FIGS. 8A-8C illustrates the detection statistics under two different types of collusion attacks. FIG. 8A shows the collusion results under a random interleaving attack, where the control points for each curve are equiprobably taken from two differently fingerprinted maps. The collusion attack shown in FIG. 8B and FIG. 8C is known as averaging, where the coordinates of the corresponding control points from two and five differently fingerprinted maps are averaged, respectively. The availability of correct point correspondence has been assumed. It should be observed from the detection statistics that the embedded fingerprints from all contributing users survive the collusion attacks and are identified with high confidence.

Figure 9A:
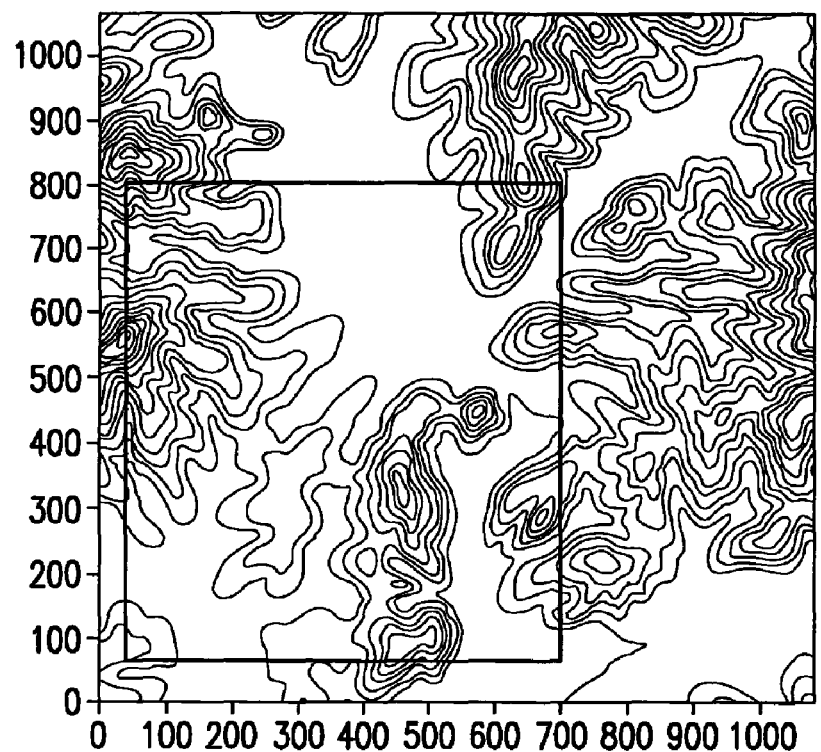
FIGS. 9A-9C illustrate failure of attempts at bypassing the fingerprinting of the present invention by image cropping.
Figure 9B:
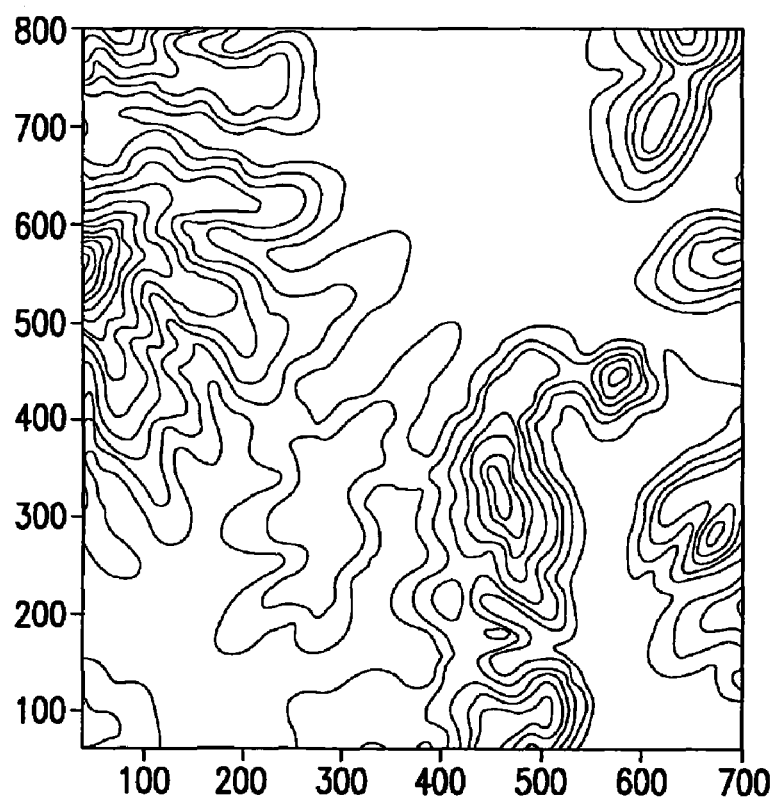
Figure 9C:
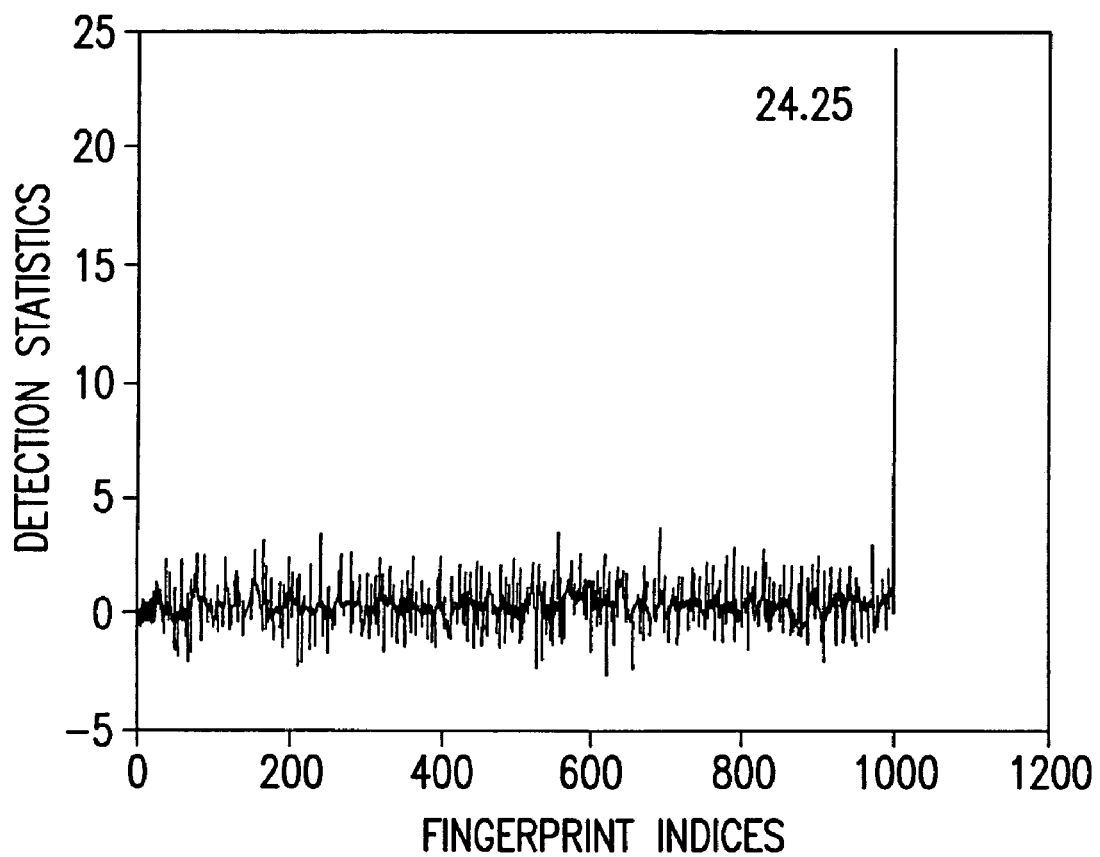

As shown in FIG. 9A and FIG. 9B, an area of a fingerprinted vector map is cropped and utilized as the test map. Among the nine curves used for carrying the fingerprint, only two curves are retained having sufficient length to carry a fingerprint sequence. Using the original map as a reference, detection is performed on these two retained segments and obtain the detection result shown in FIG. 9C. As is shown, the detection statistic with the correct fingerprint is still sufficiently high so that its corresponding user can be identified with high confidence.

Figure 10A:
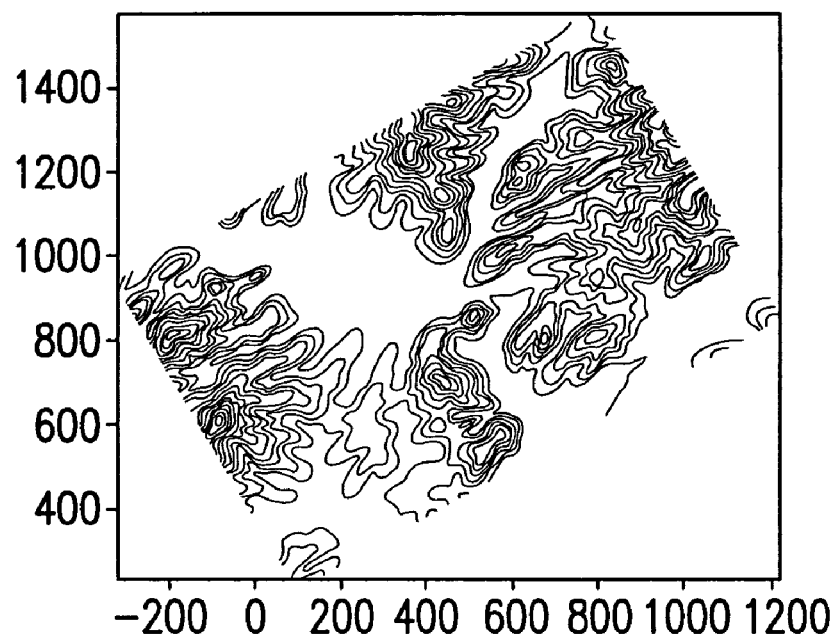
FIGS. 10A-10C illustrate the detection of a fingerprint in a curve in accordance with the invention after attempts at bypassing the fingerprinting by affine transformation of the image.
Figure 10B:
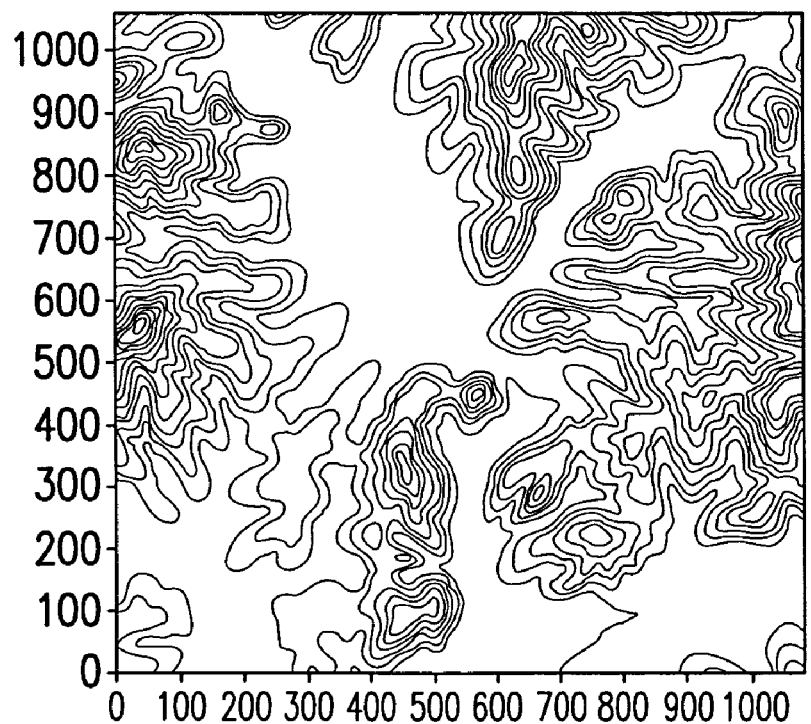
Figure 10C:
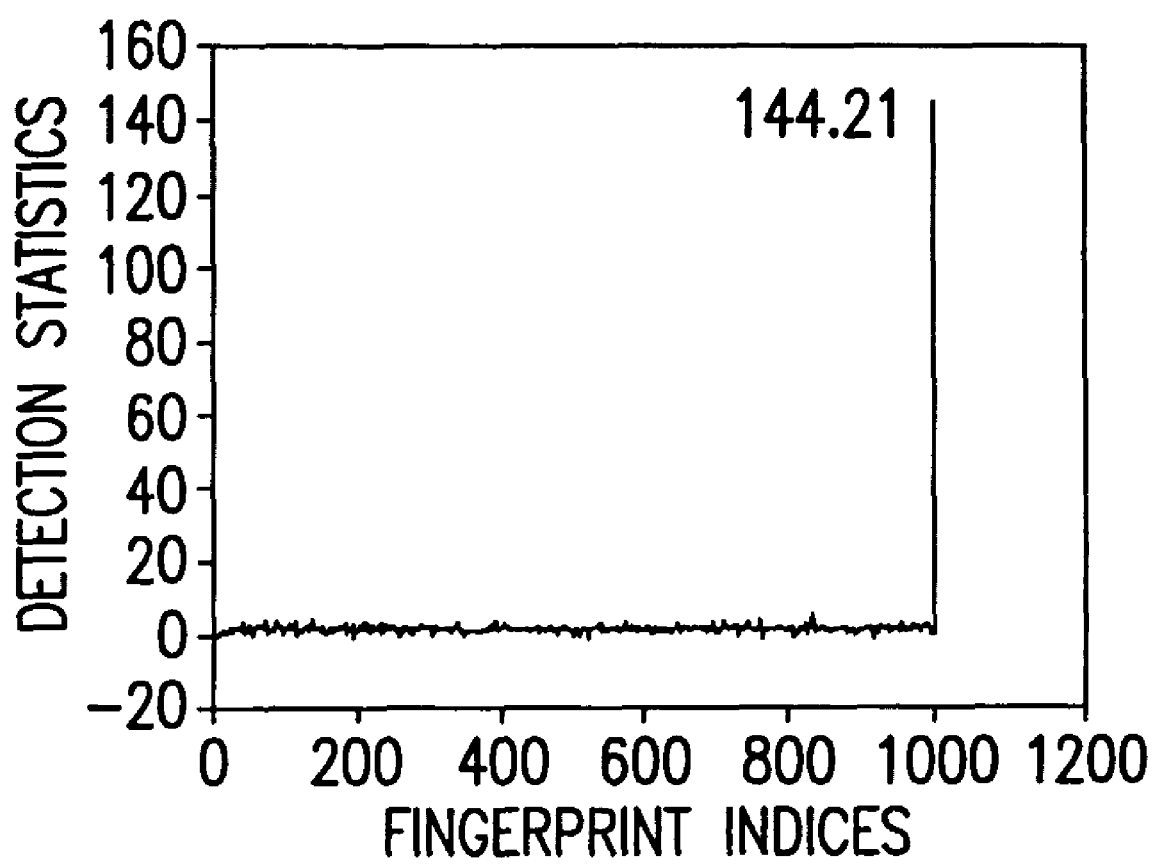

To demonstrate the resilience of the invention to a substantial amount of affine transformations, a fingerprinted vector map has applied thereto a combination of rotation, scaling, and translation. More specifically, the image is rotated by 30°, then scaled by 120% and 80% in the X and Y directions, respectively, followed by 100- and 200-pixel translation in the X and Y directions, respectively. The resulting vector map is shown in FIG. 10A. It is assumed that correct point correspondence is available. Thus, the super-curve alignment method cited above can be directly applied to register the original and the test curves and to extract the control points. The registered vector map is shown in FIG. 10B, and FIG. 10C shows the detection statistics. It is observed that the embedded fingerprint can survive affine transformations, and the detection statistic with the correct fingerprint is high after the registration.

Figure 11A:
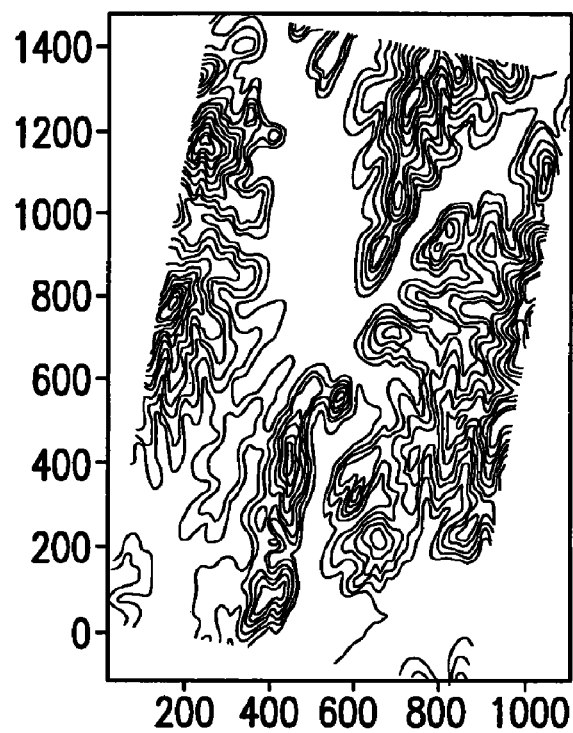
FIGS. 11A-11C illustrate the detection of a fingerprint in a curve in accordance with the invention using IAM after attempts at bypassing the fingerprinting by vector-raster-vector conversion combined with affine transformation of the image.
Figure 11B:
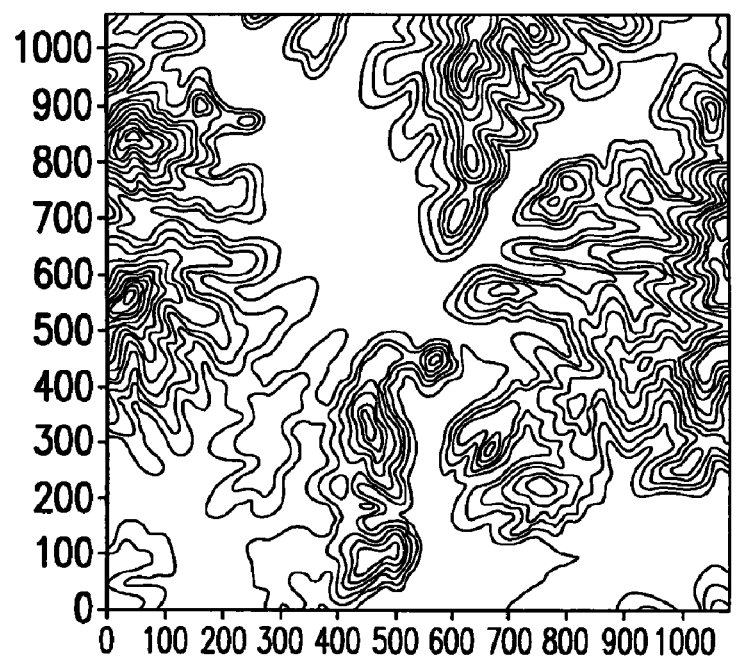
Figure 11C:
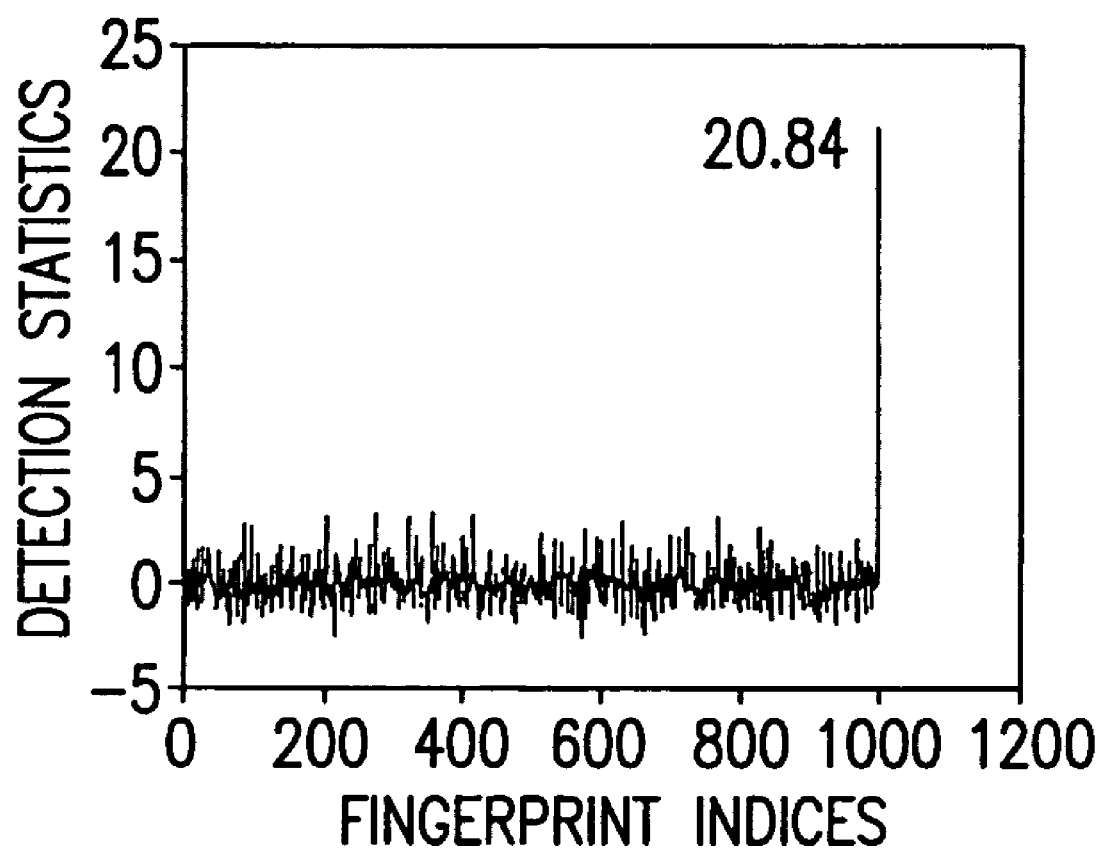

To demonstrate the resilience of the invention to vector-raster conversion coupled with possible affine transformations, a fingerprinted vector map after raster rendering as a 1100×110 image and affine transformations is provided as shown in FIG. 11A. The affine transformation consists of 10° rotation, 80% and 140% scaling in the X and Y directions, respectively, and 10- and 20-pixel translation in the X and Y directions, respectively. As the point correspondence is no longer directly available after the vector-raster conversion, the IAM algorithm is applied to estimate the transform parameters and to locate the sample points on test curves corresponding to those used in the embedding. After 15 iterations, the registered raster map results as is shown in FIG. 11B, with the detection statistics being shown in FIG. 11C. The detection statistic results suggest that the embedded fingerprint is identified with high confidence. Using a personal computer known in the art, the total duration of the detection process is approximately 42.43 sec., including 40.05 sec for curve registration and fingerprint extraction from nine curves and 2.38 sec for evaluating Z statistics with 1000 fingerprint sequences.

Figure 12A:
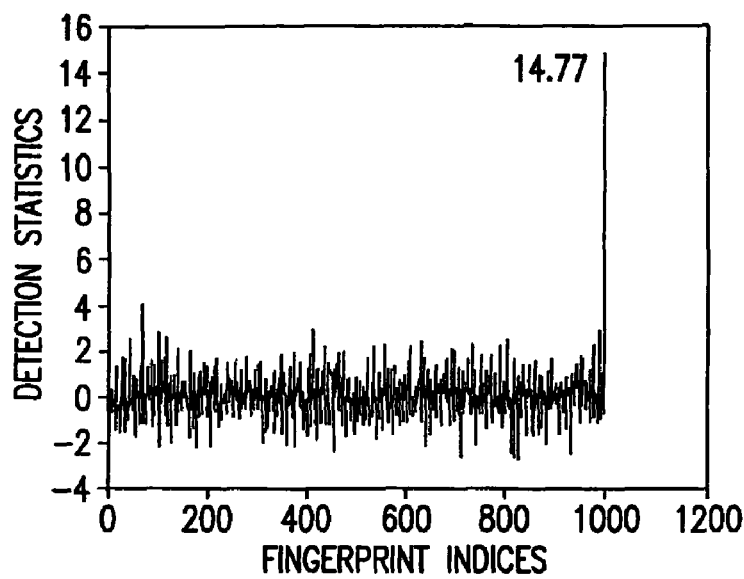
FIG. 12A is a graph of detection statistics of fingerprinted curves after attempts at bypassing the fingerprinting of the present invention by vector-raster-vector conversion.

To demonstrate the resilience of the present invention to vector-raster-vector conversion, a fingerprinted vector map is first rendered as a raster map. Then, the rendered map is uniformly sampled to obtain a new vector map, which has the same number of vector points as prior to the conversion, but at different sampling locations. In the detection process, this "new" vector map is rendered as a raster map by linear interpolation and then the IAM algorithm is applied. From the high detection statistic shown in FIG. 12A, it is readily observed that the invention method is robust against the vector-raster-vector attack.

Figure 12B:
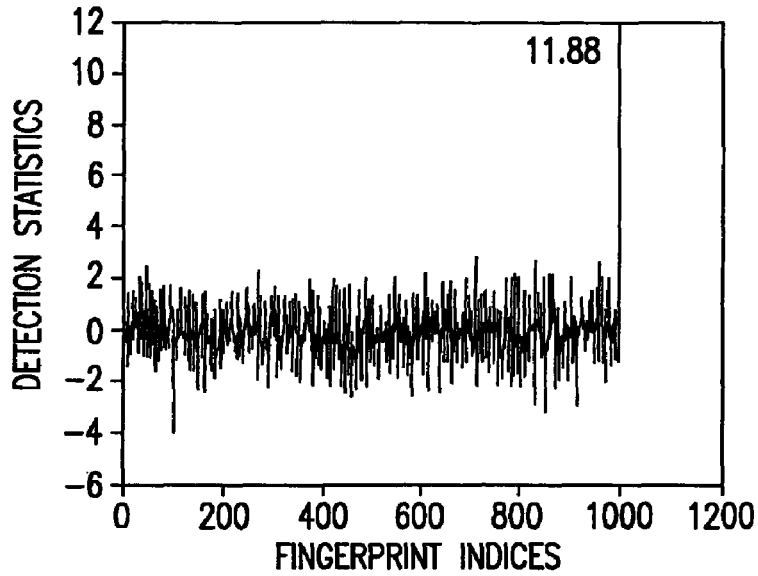
FIGS. 12B-12C are graphs of detection statistics of fingerprinted curves after attempts at bypassing the fingerprinting of the present invention by point deletion in vector maps and raster maps, respectively.
Figure 12C:
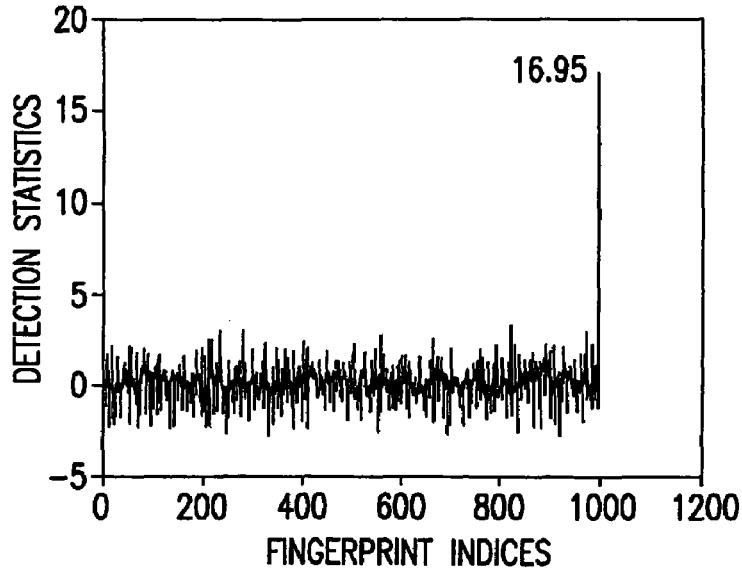

Traitor tracing applications usually involve adversaries who have strong incentives to remove fingerprints. Attackers may delete a certain number of points from a fingerprinted vector/raster map while keeping similar shapes of its contour lines. Detection statistics after point deletion in a fingerprinted vector and raster are shown in FIGS. 12B and 12C, respectively. For the vector map, 20% of points were randomly chosen and removed from each fingerprinted curve, whereas in the raster map 70% of black pixels on the curve were randomly chosen and removed. It is plain that the embedded fingerprints can survive point deletion applied to both vector maps and raster maps. Similar to the vector-raster-vector conversion test, linear interpolation and the IAM algorithm were used in fingerprint detection.

Figure 13A:
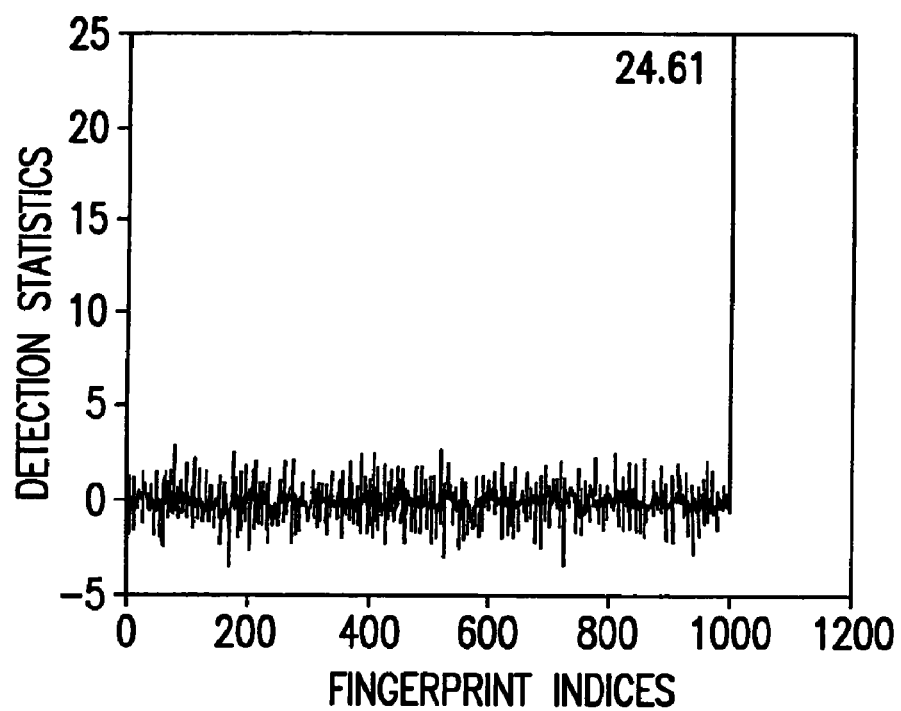
FIGS. 13A-13B are graphs of detection statistics of fingerprinted curves after attempts at bypassing the fingerprinting of the present invention by curve smoothing.
Figure 13B:
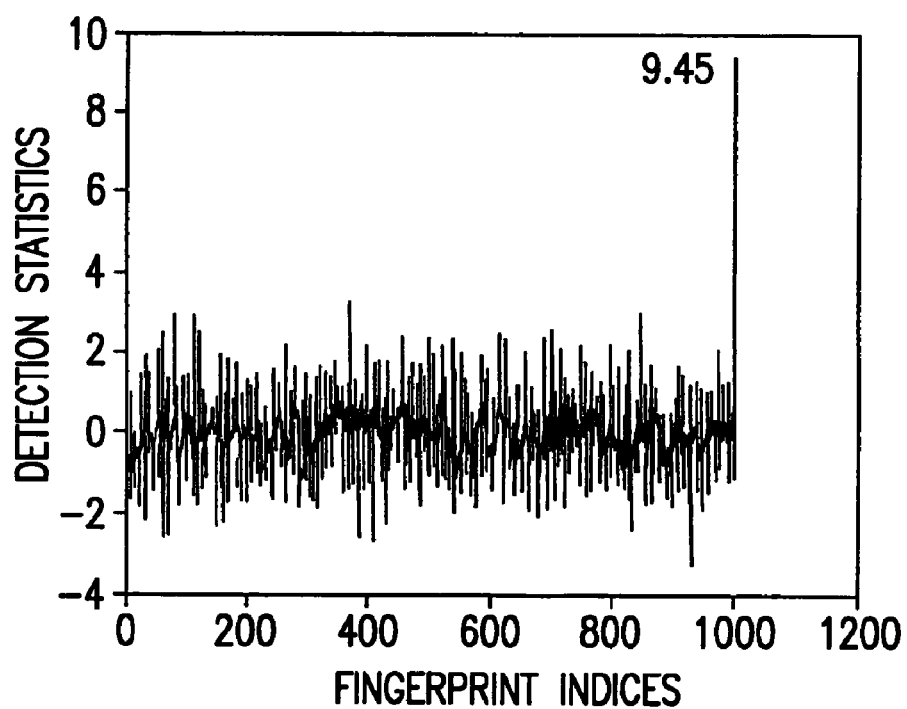

Similar to lowpass filtering for images, curve smoothing can be applied to topographic maps as an attempt to remove the embedded fingerprint. In order to demonstrate the resilience of the inventive method to curve smoothing, each marked curve is traversed and a moving average filter is applied thereto. A curve point with coordinates $(r_{x_i}, r_{y_i})$ will be replaced by a new point, whose coordinates $(r_{x_i}^{(s)}, r_{y_i}^{(s)})$, by $$\begin{cases} r_{x_i}^s = \frac{1}{2S+1} \sum_{j=-S}^{S} r_{x_{i+j}} \\ r_{y_i}^s = \frac{1}{2S+1} \sum_{j=-S}^{S} r_{y_{i+j}} \end{cases} \quad (25)$$

where 2S+1 is the filter length. Finally, the IAM algorithm of the present invention is applied to these smoothed curves and the detection statistics were computed. Two different filter lengths (5 and 21) are used in our experiments. As shown in FIG. 13A and FIG. 13B, respectively, the detection statistic with the correct fingerprint under five-point averaging is 24.61 and that under 21-point averaging is 9.45. Indeed, the fingerprint is weakened by the smoothing operation, but the detection statistics are still well above the threshold for a correct positive detection. In the latter case, when a long filter is used in the smoothing attack, some visual details are lost from the curves. The present invention is robust against curve smoothing, provided that the smoothing does not severely change the shape of the curve and the fingerprint sequence is sufficiently long for the detector to collect adequate information for a positive detection.

The present invention has been shown above as being an effective method for concealing data in 2-dimensional image data. It is to be noted, however, that the invention is not confined to such images. In fact, the extension of the present invention to 3-D digital elevation maps (DEMs) is described in the paragraphs that follow.

Figure 14A:
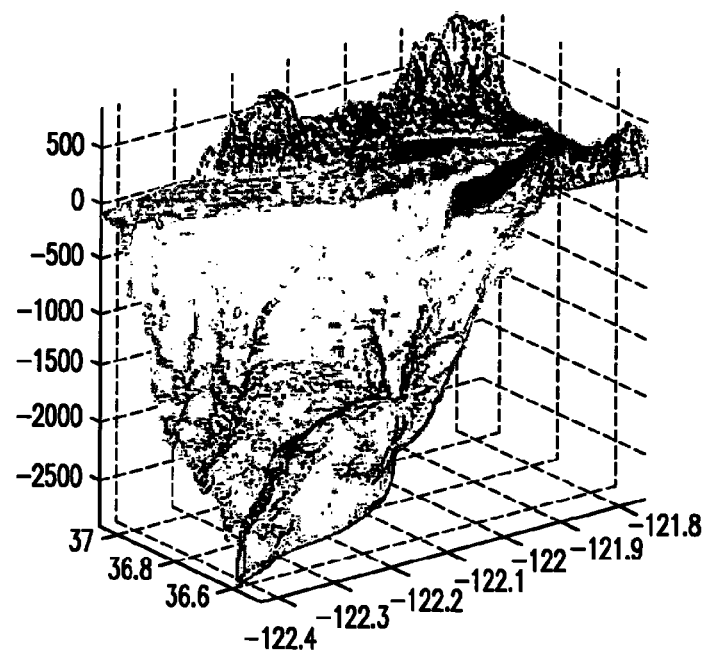
FIGS. 14A-14C illustrate the derivation of 2D contours from 3D digital elevation maps.

A DEM provides a discrete digital representation of surface terrains, by defining a set of points (x, y, z) in three-dimensional space. The coordinates (x, y) indicate the spatial location of the point, while the z coordinate represents its elevation. An example DEM for the Monterey Bay region is shown in FIG. 14A, where the ocean-floor depth data are obtained from the U.S. National Geophysical Data Center (NGDC). In recent years, acquisition systems used to obtain DEM data have been improved to achieve better resolution in both the spatial plane and the elevation coordinate. With such improvement, DEMs have become more widely used in military and commercial operations, such as navigation, landing, petroleum exploration, and land use planning. Because of the large amount of efforts put in acquiring DEM data as well as their critical role in practical applications, DEMs have high commercial values and should be protected from unauthorized copying and re-distribution. Furthermore, DEM data used in military applications contain sensitive information, and prompt the need for preventing information leakage as well as tracing the source of a leak.

Figure 14B:
Figure 14C:
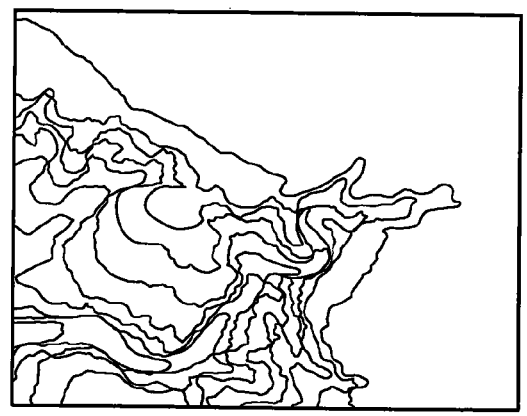

The data points of DEMs are generally acquired and archived using a rectangular grid. If the spatial location (x, y) are taken as the image coordinates, and the elevation value z as the image intensity, a 3-D DEM can be represented by a 2-D gray-scaled image, as shown in FIG. 14B. A DEM generally contains significant amounts of redundant information in that neighboring points in many regions have smoothly changing elevations. Thus, applications of the DEM often focus on elevation contours extracted from the DEM, as opposed to the DEM itself A contour line represents the earth's surfaces that have an equal altitude. From a given DEM, a set of contours corresponding to certain elevations can be extracted, forming a 2-D topographic map as shown in FIG. 14C.

To extend the curve based embedding of the present invention to the 3-D DEM data, a determination as to which contours to select for hiding fingerprints must be made. There is a danger that if certain contours selected for embedding the fingerprint will not be used by an adversary in rendering 2-D contours from a protected DEM. Such attack can substantially remove the fingerprint.

A DEM has critical contours corresponding to topographic features of a terrain, such as the maxima, the minima, and the saddle points. As critical contours are essential to a DEM and largely determine the terrain features, attackers are often not willing to completely remove or seriously distort them. Thus, in certain embodiments of the invention, the critical contours corresponding to saddle points are extracted and used to carry the fingerprint. Of course, other critical contours may be selected but consideration to the probability of their exclusion in an attack should be duly paid.

Figure 15:
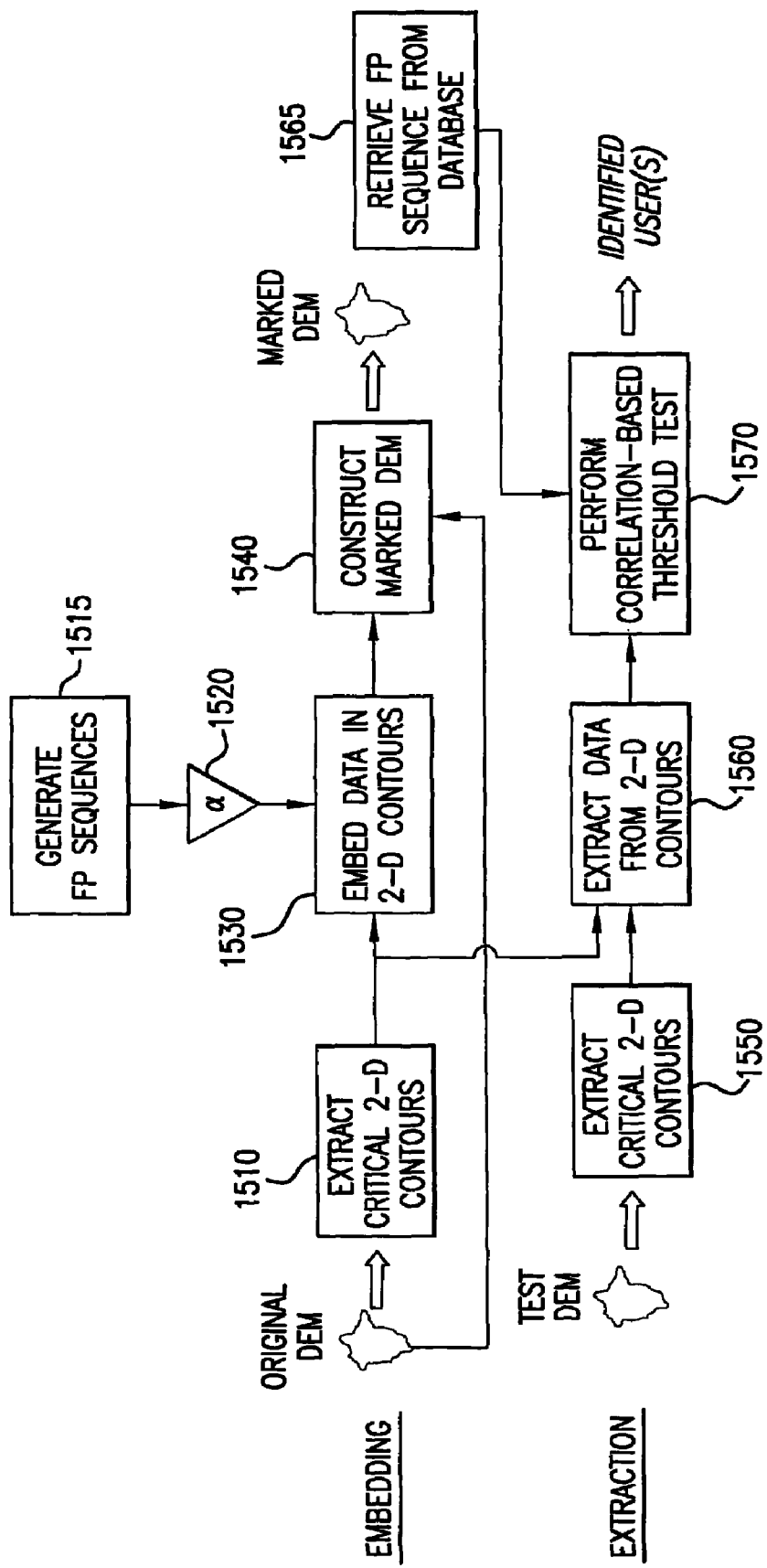
FIG. 15 is a block diagram illustrating process flow and fundamental functional components of contour extracting embodiments of the present invention applied to 3D digital elevation maps.

The fundamental steps of the invention are shown in FIG. 15. As shown in the Figure, the critical 2-D contours are identified and extracted from the given DEM, as shown at block 1510. Flow is then transferred to block 1530, where the fingerprint sequence, generated in block 1515 and scaled in block 1520 as described above, are embedded into the selected 2-D contours in accordance with the invention. A fingerprinted DEM is constructed in block 1540 from the marked 2-D contours.

To detect the fingerprint(s) from a suspicious DEM, the critical contours are extracted at the elevations corresponding to those used in the embedding, as shown at block 1550. In certain embodiments of the invention, the data in question are already rendered in 2-D contours, in which case they are passed directly to the detector. The fingerprint sequence is determined from these 2-D contours, as shown at block 1560, by the inventive methods described above. The similarity between the estimated fingerprint sequence and a fingerprint sequence retrieved from a database, as shown at block 1565, is evaluated through, for example, a correlation-based Z statistic. If the similarity is higher than a predetermined threshold, the user corresponding to the fingerprint sequence may be identified as a source of information leakage. The correlation based threshold detection is shown at block 1570 of the Figure.

The critical elevations may be identified using Morse theory and extrema filters. The upper level set of a critical elevation consists of locations where the height is greater than or equal to the critical elevation. The canny edge detection method, or similar methods known in the art, may be used to extract the boundary of the upper level set as one critical contour. Each extracted critical contour is traversed and represented as a set of ordered curve points.

As contours extracted from DEMs often exhibit a considerable amount of variations and irregularities, the curve points are non-uniformly sampled, with more sample points selected for higher-curvature segments. The selected sample points may be provided to a least-squares estimator to obtain the B-spline control points of the contour. Finally, a scaled version of the fingerprint sequence is added to the coordinates of the B-spline control points, and a watermarked 2-D contour is constructed from the watermarked control points by using the B-spline synthesis equation.

To produce the watermarked 2-D contours to be recoverable from the constructed DEM with high accuracy, the elevation values of the original 3-D DEM are modified at locations around the marked contour so that the upper level set from the modified 3-D DEM has the marked 2-D contour as its boundary.

The descriptions above are intended to illustrate possible implementations of the present invention and are not restrictive. Many variations, modifications and alternatives will become apparent to the skilled artisan upon review of this disclosure. For example, method steps equivalent to those shown and described may be substituted therefor, elements and methods individually described may be combined, and methodologies described as discrete may be distributed across many algorithms. The scope of the invention should therefore be determined not with reference to the description above, but with reference to the appended Claims, along with their full range of equivalents.

What is claimed is:

1. A computer-implemented method of conveying information through data concealed in an image, the method comprising the steps of:

providing a numerical model operable to produce a curve responsive to a plurality of parameters provided thereto;

selecting a plurality of numerical values representative of the data;

selecting at least one original curve in the image;

determining a plurality of first parameters such that said model produces said original curve responsive thereto;

adding each of said plurality of values to a corresponding one of said plurality of said first parameters to produce a plurality of second parameters;

forming a marked curve via said model by providing thereto said plurality of second parameters;

replacing said original curve in the image with said marked curve;

determining a plurality of third parameters such that said model produces said marked curve responsive thereto;

and retrieving each of said plurality of values added in said value adding step from a difference between said corresponding first parameter and a corresponding third parameter; wherein said difference corresponds to a manipulation of said marked curve by at least one user, and noise resulting from unauthorized use of said marked curve; where said first parameter determining step includes the steps of:

sampling said original curve into a plurality of sample points thereof; and determining each of said plurality of first parameters as that which produces a corresponding set of said sample points of said original curve when provided to said model;

where said third parameter determining step includes the steps of:

sampling said marked curve into a plurality of sample points thereof; and determining each of said plurality of third parameters as that which produces a set of said sample points of said marked curve when provided to said model.

2. The method of conveying information through data concealed in an image as recited in claim 1, where said original curve selecting step includes the step of selecting as said original curve a contour of a two-dimensional image.

3. The method of conveying information through data concealed in an image as recited in claim 2, where said contour selecting step includes the step of selecting said contour from a map.

4. The method of conveying information through data concealed in an image as recited in claim 3, where said contour extracting step includes the step of extracting said contour from isometric data of a digital elevation map.

5. The method of conveying information through data concealed in an image as recited in claim 3, where said original curve selecting step includes the step of selecting a contour of said digital elevation map corresponding to one of the group of terrain features including an elevation maximum, an elevation minimum and an elevation saddle point.

6. The method of conveying information through data concealed in an image as recited in claim 2, where said contour selecting step includes the step of extracting said contour from isometric data of a three-dimensional image.

7. A computer-implemented method of conveying information through data concealed in an image, the method comprising the steps of:

providing a numerical model operable to produce a curve responsive to a plurality of parameters provided thereto;
selecting a plurality of numerical values representative of the data;
selecting at least one original curve in the image;
determining a plurality of first parameters such that said model produces said original curve responsive thereto;
adding each of said plurality of values to a corresponding one of said plurality of said first parameters to produce a plurality of second parameters;
forming a marked curve via said model by providing thereto said plurality of second parameters;
replacing said original curve in the image with said marked curve;
determining a plurality of third parameters such that said model produces said marked curve responsive thereto;
and retrieving each of said plurality of values added in said value adding step from a difference between said corresponding first parameter and a corresponding third parameter; wherein said first parameter determining step includes the steps of:
sampling said original curve into a plurality of sample points thereof; and
determining each of said plurality of first parameters as that which produces a corresponding set of said sample points of said original curve when provided to said model; wherein said third parameter determining step includes the steps of:
sampling said marked curve into a plurality of sample points thereof; and
determining each of said plurality of third parameters as that which produces a set of said sample points of said marked curve when provided to said model wherein said original curve and said marked curve are sampled in accordance with a first sample rate in regions of high variability in curvature thereof and said original curve and said marked curve are sampled in accordance with a second sample rate in regions of low variability of curvature thereof, said first sample rate being greater than said second sample rate.

8. A computer-implemented method of conveying information through data concealed in an image, the method comprising the steps of:

providing a numerical model operable to produce a curve responsive to a plurality of parameters provided thereto;
selecting a plurality of numerical values representative of the data;
selecting at least one original curve in the image;
determining a plurality of first parameters such that said model produces said original curve responsive thereto;
adding each of said plurality of values to a corresponding one of said plurality of said first parameters to produce a plurality of second parameters;
forming a marked curve via said model by providing thereto said plurality of second parameters;
replacing said original curve in the image with said marked curve;
determining a plurality of third parameters such that said model produces said marked curve responsive thereto;
and retrieving each of said plurality of values added in said value adding step from a difference between said corresponding first parameter and a corresponding third parameter; wherein said first parameter determining step includes the steps of:
sampling said original curve into a plurality of sample points thereof; and
determining each of said plurality of first parameters as that which produces a corresponding set of said sample points of said original curve when provided to said model; wherein said third parameter determining step includes the steps of:
sampling said marked curve into a plurality of sample points thereof;
estimating a set of transform parameters operable to orient said sample points of said marked curve into common orientation with said sample points of said original curve;
transforming said marked curve with said set of transform parameters, said transformed marked curve including corresponding transformed curve points;
fitting said sample points of said original and said transformed sample points of said marked curve with a single curve;
determining said plurality of fourth parameters such that said model produces said fitted curve responsive thereto;
minimizing through varying said plurality of fourth parameters and said set of transform parameters a fitting error between said sample points of said original curve and a plurality of points produced by said model responsive to said fourth parameters and a fitting error between said transformed sample points of said marked curve and said plurality of points produced by said model responsive to said fourth parameters;
and assigning each of said plurality of fourth parameters to a corresponding one of said plurality of third parameters subsequent to said fitting error minimizing step.

9. The method of conveying information through data concealed in an image as recited in claim 8 further including the steps of:

determining a nearest transformed curve point of said transformed second curve to each of said plurality said first sample points;
assigning each nearest transformed curve point to a corresponding one of said second sample points;
assigning each of said set of transform parameters as varied in said fitting error minimizing step to a corresponding one of said set of transform parameters;
transforming said second sample points by a set of inverse transform parameters, each of said set of inverse transform parameters being an inverse transform of a corresponding one of said set of transform parameters subsequent to said transform parameter assigning step;
and repeating the method at said marked curve transforming step until a predetermined criterion has been met.

* * * * *